(12) United States Patent
Kern et al.

(10) Patent No.: US 7,761,740 B2
(45) Date of Patent: Jul. 20, 2010

(54) POWER SAFE TRANSLATION TABLE OPERATION IN FLASH MEMORY

(75) Inventors: Wiliam Kern, Palo Alto, CA (US); Chih Hsueh, Cupertino, CA (US); Ping Hou, Fremont, CA (US)

(73) Assignee: Spansion LLC, Sunnyvale, CA (US)

( * ) Notice: Subject to any disclaimer, the term of this patent is extended or adjusted under 35 U.S.C. 154(b) by 391 days.

(21) Appl. No.: 11/955,934

(22) Filed: Dec. 13, 2007

(65) Prior Publication Data

US 2009/0158085 A1 Jun. 18, 2009

(51) Int. Cl.
G06F 11/00 (2006.01)
(52) U.S. Cl. ...................................................... 714/15
(58) Field of Classification Search .................. 714/15, 714/16; 711/205, 206, 207
See application file for complete search history.

(56) References Cited

U.S. PATENT DOCUMENTS

| | | | |
|---|---|---|---|
| 5,559,957 A * | 9/1996 | Balk ............................ 714/23 |
| 5,889,933 A * | 3/1999 | Smith .......................... 714/22 |
| 5,973,964 A * | 10/1999 | Tobita et al. ........... 365/185.33 |
| 6,170,066 B1 * | 1/2001 | See .............................. 714/22 |
| 6,665,813 B1 * | 12/2003 | Forsman et al. ............... 714/15 |
| 7,003,620 B2 * | 2/2006 | Avraham et al. ............. 711/103 |
| 7,017,078 B2 * | 3/2006 | Frimout ....................... 714/20 |
| 2003/0028746 A1 * | 2/2003 | Durrant ...................... 711/206 |
| 2003/0145167 A1 * | 7/2003 | Tomita ........................ 711/114 |
| 2004/0017707 A1 * | 1/2004 | Wallace et al. .............. 365/200 |
| 2005/0166088 A1 * | 7/2005 | Yamagami et al. ............. 714/8 |

* cited by examiner

Primary Examiner—Robert Beausoliel
Assistant Examiner—Amine Riad
(74) Attorney, Agent, or Firm—Turocy & Watson, LLP

(57) ABSTRACT

Systems and/or methods that provide for the accuracy of address translations in a memory system that decouples the system address from the physical address. Address-modifying transactions are recorded in a non-volatile write buffer to couple the last-in-time translation physical address/location with the current translated physical location/address. In addition, integrity check protection may be applied to the translation and to the written data to limit the amount of data that may be lost in the event of a failure/error occurring during the write operation. Transaction recording and integrity check protection allows for recovery of write operations that may not have fully completed due to the failure/error.

20 Claims, 13 Drawing Sheets

POWER SAFE TRANSLATION TABLE OPERATION IN FLASH MEMORY

TECHNICAL FIELD

The subject innovation relates generally to memory systems and in particular to systems and methods for power-safe translation table operation in flash memory.

BACKGROUND

A wide variety of memory devices can be used to maintain and store data and instructions for various computers and similar systems. In particular, flash memory is a type of electronic memory media that can be rewritten and that can retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash memory and/or NAND flash memory, for example. NOR flash memory evolved from electrically erasable read only memory (EEPROM) chip technology, in which, unlike flash memory, a single byte can be erased; and NAND flash memory evolved from DRAM technology. Flash memory devices typically are less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory is nonvolatile; it can be rewritten and can hold its content without power. It can be used in many portable electronic products, such as cell phones, portable computers, voice recorders, thumbnail drives and the like, as well as in many larger electronic systems, such as cars, planes, industrial control systems, etc. The fact that flash memory can be rewritten, as well as its retention of data without a power source, small size, and light weight, have all combined to make flash memory devices useful and popular means for transporting and maintaining data.

When flash memory is used to provide a reliable and efficient secondary memory subsystem two characteristics must be considered. One characteristic of flash memory is that it can only write data in one direction, in other words, a "1" can become a "0" but a "0" can not then become a "1". The other characteristic of flash memory to be considered, often referred to as cycle endurance, is the number of times the addressable elements of the device can be erased and programmed before becoming unreliable. Both of these characteristics, which are related, adversely affect the reliability and the efficiency of the device.

In order to write data to a given location in a flash memory requiring a state opposite to that which the device supports requires the location be initialized. The initialization occurs as a result of the erase process; however, at some point in time, after numerous erase program cycles, a given location may either no longer be initialized to a known state or may no longer retain the data as written. As a result of having a finite number of times that a device can cycle between the erase (i.e., initialization) and program state before becoming unreliable, previous attempts to mitigate the problem have focused on extending storage persistence of the device by minimizing the number of erase program cycles.

In current flash memory devices the system writes to a particular address based on one-to-one relationship between the logical or system address and the physical address. If a particular address is used at a higher frequency than other addresses, which is characteristic of the one-to-one relationship, those locations will characteristically undergo more frequent erase program cycles. In addition to latency that is introduced by the write operation requiring initialization prior to recording, the flash memory device will eventually fail based over use of addresses having a higher erase program frequency (i.e., cycle endurance) while other addresses experience minimal erase program cycling.

FIG. 1 provides a timeline representation 100 of the read and write operations in conventional flash memory device utilizing a one-to-one relationship between the logical/system address and the physical address, in accordance with the prior art. This type of addressing relationship is generally beneficial in that it is simple to implement and provides for minimal latency experienced in determining the location of the data's physical address (i.e., the read operation). For example at block 104, a read operation 102 ensues by providing a system address "1001". At block 106, since the system address has a one-to-one relationship with the physical address, the physical address will be the same as the system address thus, as shown in this example, the physical address is also "1001". This one-to-one relationship allows for the system to retrieve the data from data store 108 in the location 110 designated as physical address "1001" without introducing any latency in the read operation.

However, as illustrated in FIG. 1, the conventional write operation 112 in a flash memory device utilizing a one-to-one relationship between the logical/system address and the physical address introduces significant latency due to the flash memory requiring initialization (i.e., erase) of the media prior to recording information. At block 114, a write operation ensues by providing a system address "1001". A read operation must precede the erase operation due to unit size difference of the erase operation versus the write operation. Thus at block 116, the system attempts to read all of the pages within the block indicated by physical address "1000" through "1002" into a volatile memory commonly referred to as a merge buffer. The reading of all pages within the block is indicated in data store 108 by location 118, which includes location 110 designated as physical address "1001".

Once all of the pages within the block have been read, the erase operation, indicated by block 120, ensues. The erase operation, which typically requires about ten times the amount of time required for the actual write operation, will erase all of locations 122 in data store 108 associated with physical addresses "1000" through "1002". Once the erase operation is complete, a merge operation, which combines the unchanged data from location 1000 and 1002 with the new data for location 1001, ensues to prevent the loss of data. As a result of the merge, the amount of data to be written is typically significantly larger that the size of the original write request. The merge operation is indicated by block 124 and results in the merged data from address "1001" merged into location 126 encompassing physical addresses "1000"-"1002" within data store 108. Once the data is merged, at block 128, the system writes out all of the pages back to the block, illustrated in the data store 108 as data residing in the "1001" location 110 and the "1000" and "1002" locations 118.

The write operation that occurs when a one-to-one relationship exists between the system address and the physical address exposes large amounts of data to possible loss in the event of loss of power during the write operation. This is because once the data is erased during the write operation it is no longer available and cannot be recovered. In addition, as previously mentioned, system addresses that are written at a high frequency will typically fail sooner due to cycle endurance limitations.

FIG. 2 provides an architectural overview of a system 200 utilizing flash memory having a one-to-one relationship between the system address and the physical address, according to the prior art. The host command interface 202 is operable to interpret commands for the device. If the command is a data command, the host command interface 202 sends the data to the Level 1 cache 204 in the volatile memory 206 through the host data interface 208 and the Level 1 data cache controller 210. The host command interface 202 is also in communication with flash management 212 and the host command interface 202 indicates to the flash management 212 the need to perform either a read operation from or a write operation to the data store 220. Based on the one-to-one address relationship, flash management 212 will receive the system address from the host command interface 202 and use the address as the physical address to read or write data.

If the command received from the host command interface 202 is a read command and the content is not located in the Level 1 cache, the flash management 212 will retrieve the data from the data pages 216 within the NAND memory 218 of the data store 220 via the data storage NAND media interface 222, store the retrieved data in the Level 1 cache 204 and inform the host command interface 202 of the data availability.

If the command received from the host command interface 202 is a write command, the flash management 212 will read all the data pages 216 in the block associated with the address into merge buffer 224, then erase the data from the location within the data pages 216 on the NAND memory 218 in the data store 220. Once erased the flash management will command a merge operation and the merged data is stored in the merge buffer 224 of volatile memory 226. Once the data is merged it is subsequently written to the location associated with the physical address in the data pages 216 of the NAND memory 218 of the data store 220.

The write operation that occurs when a one-to-one relationship exists between the system address and the physical address exposes large amounts of data to possible loss in the event of loss of power during the write operation. This is because once the data is erased during the write operation it is no longer available and cannot be recovered. In addition, as previously mentioned, system addresses that are written at a high frequency will typically fail sooner due to cycle endurance limitations.

Thus, a need exists to develop a method and system for reading and writing data to flash memory that mitigates wear on the physical device. The desired method and system should serve to distribute writes across the media, thus limiting the amount on times that data is written to a specific location in the nonvolatile flash memory. Thereby, lessening the likelihood of cycle endurance causing premature failure of the flash media. Additionally, and paramount to the present innovation, the desired system and method should provide for ability to recover data in instances in which a write operation is occurring and an error or failure occurs, such as a failure attributed to a power failure or like.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that can provide for the accuracy of an address translation during a memory operation, such as a memory read or write operation. Address translation allows for the system address to be decoupled from the physical address and, thus, eliminates the one-to-one relationship between system address and physical address typically exhibited in memory systems with conventional read and write operation processing. By decoupling the system address from the physical address, data can be written more randomly in different locations throughout the storage media. As such, the storage media becomes more robust and experiences greater cycle endurance, i.e., the ability to support more read and write operations over time.

Specifically, the present innovation provides for a mechanism that allows for recovery of write operations in the event of a failure or error occurring during the write operation, such as power failure or the like. In this regard the disclosed systems and methods provide for recording one or more, preferably all, of the transactions, which modify the address translation information in a non-volatile, write buffer. The recording of the address-modifying transactions allows for a coupling, otherwise referred to herein as bookend data, to be recorded that provides for the current translation address/location to be associated with the previous, i.e., last-in-time, translation address/location.

In some aspects, the recoding of the address modifying transactions and bookend data, along with providing for integrity check protection, such as error correction code (ECC) protection or the like, over the data to be written, limits the amount of data that may be lost in the event of an operational error or failure. In the event that the write operation of the data was completed prior to the error or failure but the current translated physical address was not written to the write buffer, the data can be recovered in an auditing process that is performed at power-up. In the case of an error or failure, such as a power loss, the associated data can be verified and the translated physical address added to the associated translation table. Alternatively, if the associated data cannot be verified, then the data from the previous translation is identified as the current data and the integrity of the translation system is maintained to the greatest extent possible. In this regard, the recovery system of the present innovation provides for no loss of data except for the save/write operation that was being performed when the failure/error occurred.

In one aspect, a memory system is defined that insures data recovery in the event of a memory operation failure. The system includes volatile memory, such as SRAM, DRAM or the like and nonvolatile memory, such as flash memory, EEPROM or the like, which is in communication with the volatile memory. The system additionally includes an address translation table stored in either or both of the volatile and non-volatile memories. The address translation table is operable for decoupling a system address from a physical address during a memory write operation, such that the system address and the physical address are not in a conventional one-to-one relationship. Decoupling of the system and physical addresses allows for data to be written to different locations of the non-volatile memory regardless of the system address. The system additionally includes a non-volatile write buffer operable for storing the address-modifying transactions that occur during a memory write operation that implements the address translation table.

In one specific aspect of the system, the volatile memory may include a translation table cache operable for storing the address translation table and bookend recordings of the previous, i.e., last-in-time, physical address translation and the current translated physical address based on the recorded address-modifying transactions.

In another specific aspect of the system, the non-volatile write buffer is further defined as a way-set index write buffer operable for storing address-modifying transactions based on a set associative cache.

In yet another aspect of the system, the system may include an integrity check module, such as an error correction code (ECC) module stored in either or both of the volatile memory or non-volatile memory. The integrity check module is operable for generating an integrity check and applying the check to data being written during a write operation. In this regard, the system may additionally include a recovery module stored in either or both of the volatile memory or the non-volatile memory. The recovery module is operable to validate the integrity check after an interruption in the write operation to determine if the write operation has completed. In one aspect, the recovery module may be operable to record the translated physical address in the address translation table if the integrity check is validated and, in other aspects, the recovery module may be operable to use the previous, i.e., last-in-time, physical address translation if the integrity check is not validated. In one specific aspect, the recovery module may be operable to access the write buffer to identify the translated physical address where the write operation was occurring prior to interruption, access the translated physical address and execute a read operation to determine if a valid integrity check is associated with the translated physical address.

In an alternate aspect an electronic device is defined that insures data recovery in the event of a memory operation failure. The device includes volatile memory, such as SRAM, DRAM or the like and nonvolatile memory, such as flash memory, EEPROM or the like, which is in communication with the volatile memory. The device additionally includes an address translation table stored in either or both of the volatile and non-volatile memories. The address translation table is operable for decoupling a system address from a physical address during a memory write operation, such that the system address and the physical address are not in a conventional one-to-one relationship. Decoupling of the system and physical addresses allows for data to be written to different locations of the non-volatile memory regardless of the system address. The device additionally includes a non-volatile write buffer operable for storing the address-modifying transactions that occur during a memory write operation that implements the address translation table.

The device of the alternate aspect may be one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with a motor vehicle, a global positioning satellite (GPS) device, an electronic device associated with an airplane, an electronic device associated with an industrial control system, a Hardware Security Module (HSM), a set-top box, a secure memory device with computational capabilities, or an electronic device with at least one tamper-resistant chip.

A further aspect of the innovation is provided for by a method for insuring data recovery in the event of a memory operation failure in a non-volatile memory system. The method includes providing for an address translation table that is operable for decoupling a system address from a physical address during a memory write operation, such that the system address and the physical address are not in a conventional one-to-one relationship. Decoupling of the system and physical addresses allows for data to be written to different locations of the non-volatile memory regardless of the system address. The method also includes performing a system address to physical address translation during a write operation using the address translation table and storing one or more address-modifying transactions that occur during the translation in a non-volatile write buffer.

The method may additionally include storing a bookend recording of a previous, i.e., last-in-time, translated physical address with a current translated physical address based on the stored one or more address-modifying transactions. The bookend recording provides for recovering back to the previous data associated with the previous translated physical address if the current write operation fails or results in an error without haven written the information into the non-volatile memory.

According to one aspect of the method, storing the address-modifying transactions that occur during the translation in a non-volatile write buffer may further include storing the address-modifying transactions based on an organization with a set associative cache, such as way/set index architecture or the like.

In another aspect of the method, the method may include generating an integrity check, such as an error correction code (ECC) or the like, and applying the integrity check to data being written during the write operation. In such aspects, the method may additionally include validating the integrity check after an interruption in the write operation to determine if the write operation has completed. Validating the integrity check may further include accessing the non-volatile write buffer to identify the translated physical address where write operation was occurring prior to the interruption, accessing the translated physical address and executing a read operation to determine if a integrity check is associated with the translated physical address. In one aspect the method may include recording the translated physical address in the address translation table if the integrity check is validated and, in another aspect the method may include using a last-in-time physical address translation if the integrity check is not validated.

As such, the present innovation provides improved accuracy in write operations that use address translations to remap system addresses/locations to physical/device addresses/locations in order to distribute the use of the non-volatile memory in terms of cycle endurance (i.e., erase/program cycles). Present aspects provide for recording/storing the address-modifying transactions in a non-volatile write buffer as a means of providing an association between the previous address translation address/location and the current address/location. In addition, present aspects of the innovation may provide for integrity check protection, such as error correction code (ECC) protection to be applied to the translated physical address and the data being written, such that integrity check validation may be performed in the event of an write operation error or failure, such as due to sudden power loss or the like. Integrity check validation allows for recovery of write operations which may have not fully completed prior to the error or failure and for the system to refer back to the previous physical address translation and the data associated therewith, if the integrity check validation is not verified. In this regard, the system provides integrity to the write operation to the greatest extent possible with minimizing the loss of data and providing a reference back to the previously written data if the write operation was not completed to the extent necessary.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
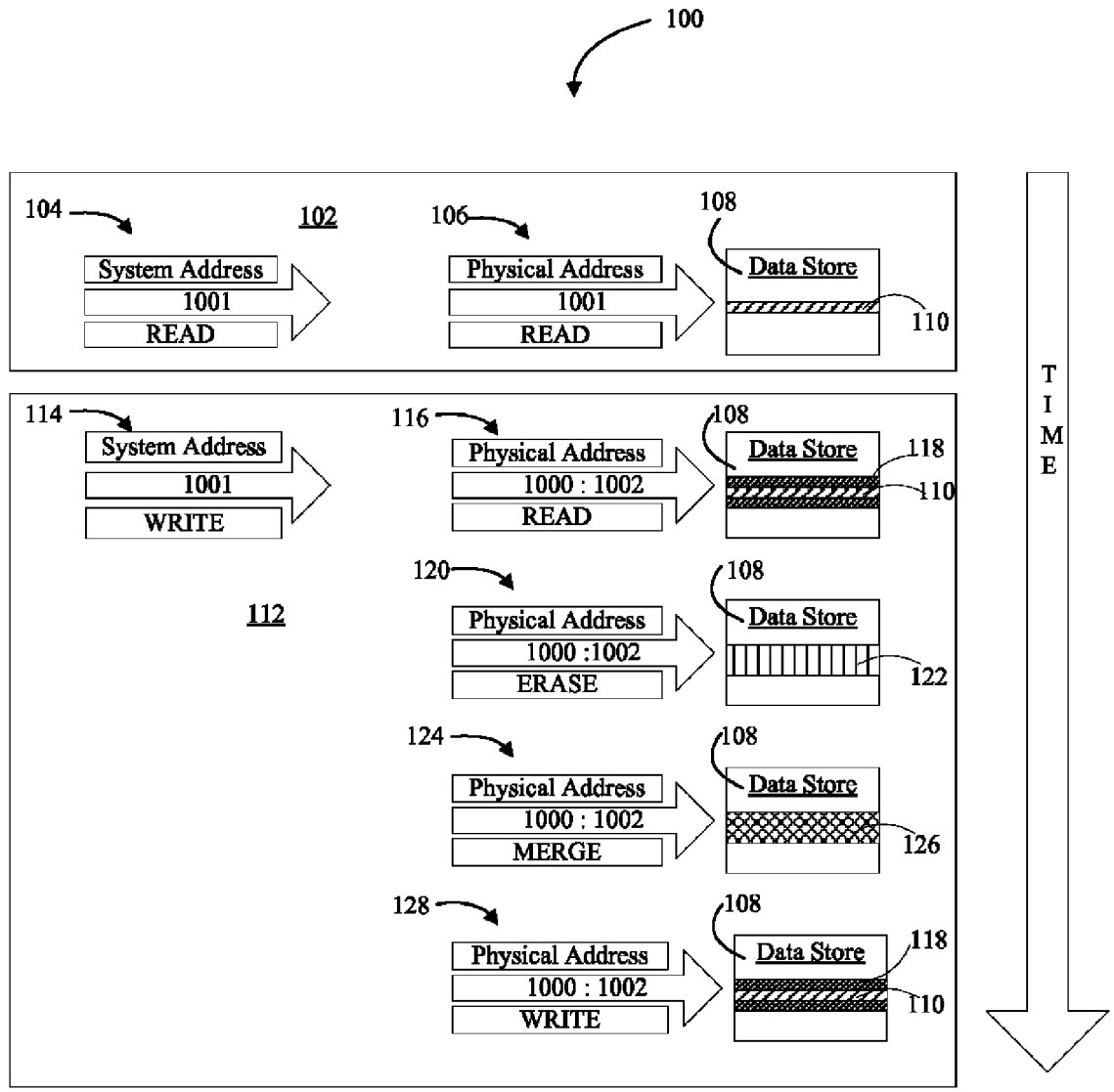
FIG. 1 illustrates a block diagram and associated timeline for conventional read and write operations in non-volatile memory, in accordance with the prior art.
Figure 2:
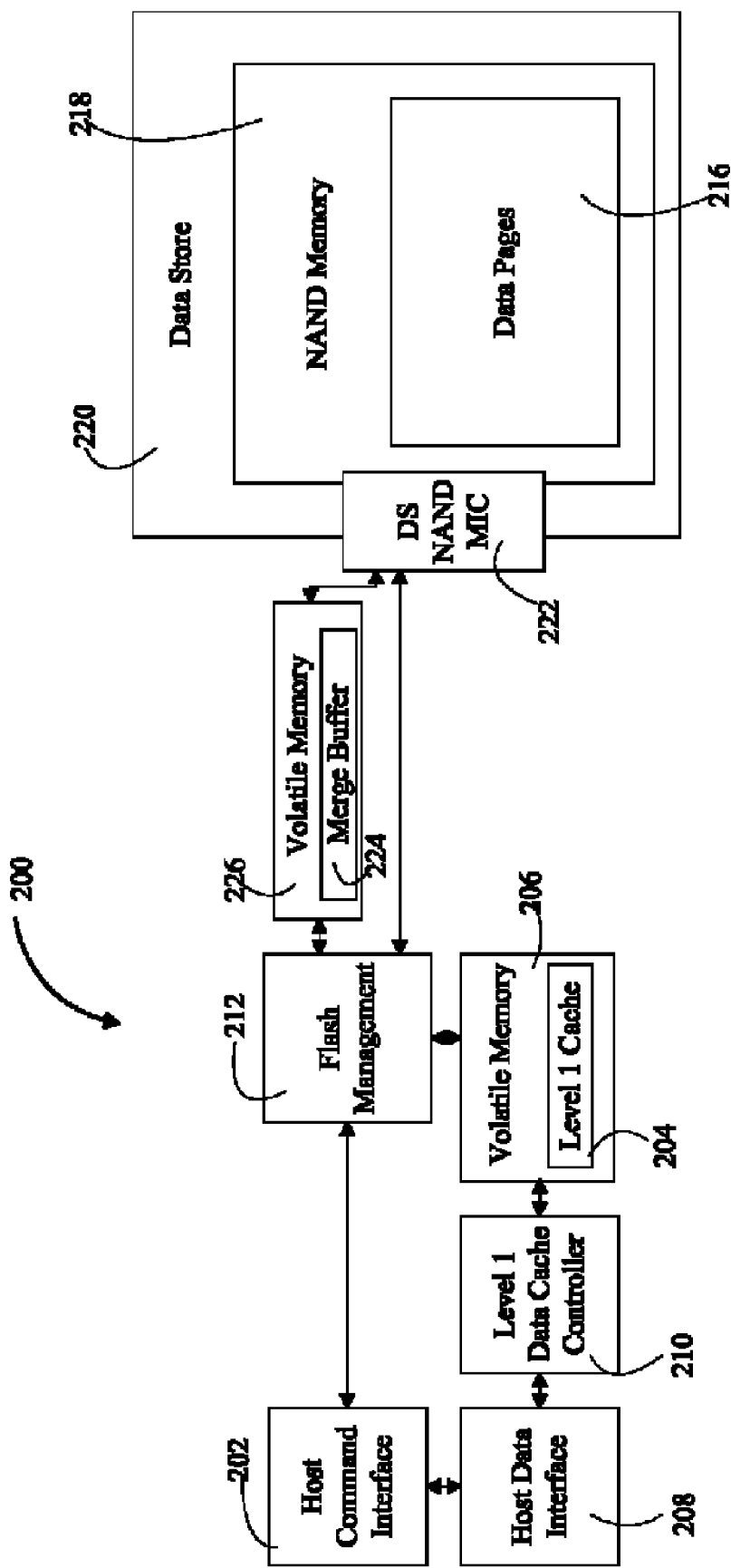
FIG. 2 illustrates a block diagram of a system for managing non-volatile memory operations, in accordance with the prior art.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

In a memory operation system that utilizes address translation to remap or decouples system addresses/locations to and from physical/device addresses/locations in order to distribute the use of the storage space throughout the media and to increase cycle endurance (i.e., the number of erase/program cycles that the media can support), accuracy of the translation process is necessary in order to retrieve the correct data. If the memory operation, such as a write operation, results in an error or a failure, such as may occur due to sudden loss of power or the like, it is imperative that the system recover. Recovery may provide for the data that was being written when the error or failure occurred to be completed and the associated translated physical address recorded in the translation table and/or recovery may provide for the use of the previous, i.e., last-in-time translated physical address and the data associated therewith, if the error or failure prevented the current data from being written.

In this regard, present aspects provide for the accuracy of the translation process by recording address-modifying transactions in a non-volatile write buffer and subsequently using these recorded address-modifying transactions to assemble and store bookend information, which couples the previous, i.e., last-in-time physical address translations with the current physical address translations. In addition, the present innovation may apply an integrity check protection, such as Error Correction Code (ECC) protection or the like, to the translated physical addresses and the data being written as a means of limiting the amount of information that may be lost (i.e., unrecovered) in the event of an error or failure in the write operation. In addition, applications of integrity check protection allow for the recovery of write operations, which may have not fully completed when the error or failure occurred. For example, in the instance in which the write operation of the data was complete but the current address translation was not written to the write buffer, the information can be recovered in an auditing process, which is performed at power-up or at re-initiation of the write process. In an alternate example, in which the write operation was not completed, the data from the previous physical address translation will be identified as the "current" data.

Figure 3:
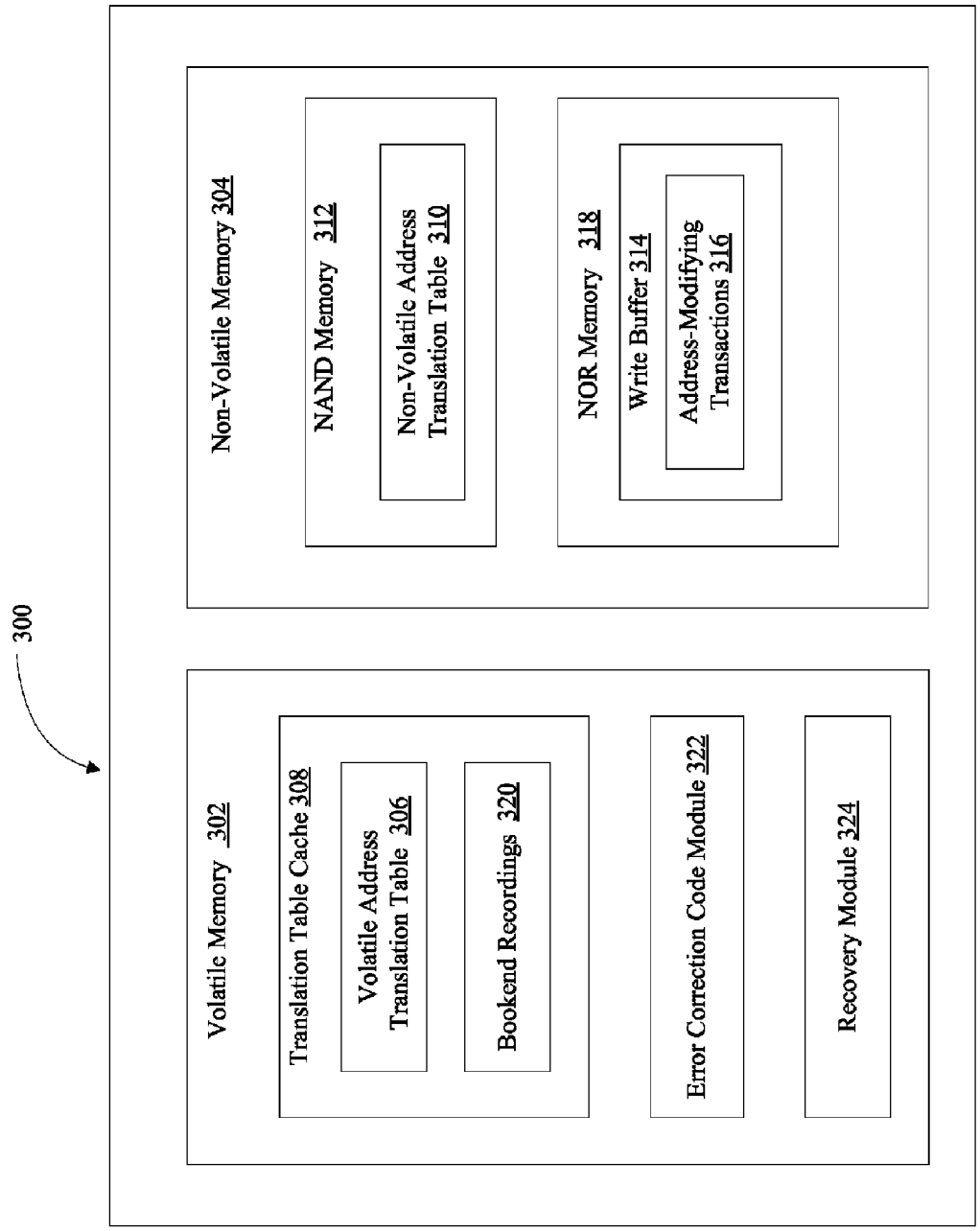
FIG. 3 illustrates a high-level block diagram of a system for insuring data recovery in the event of a memory operation error/failure in a non-volatile memory system, in accordance with an aspect of the subject matter disclosed herein.

Turning to the figures, FIG. 3 illustrates a block diagram depiction of memory operation system that utilizes address translation to remap the system address to a physical address/location and insures that data is recoverable in the event of an error or failure occurring during a write operation, in accordance with the present innovation. The system 300 includes volatile memory 302 and non-volatile memory 304. The non-volatile memory may include, but is not limited to, read-only memory (ROM), flash memory (e.g., single-level cell flash memory, multi-level cell flash memory), mask-programmed ROM, programmable ROM (PROM), Erasable PROM (EPROM), Ultra Violet (UV)-erase EPROM, one-time programmable ROM, electrically erasable PROM (EEPROM), and/or nonvolatile RAM (e.g., ferroelectric RAM (FeRAM)). In one aspect of the innovation, as shown in FIG. 3, the non-volatile memory 302 may comprise flash memory that may include NAND memory 312 and NOR memory 318. The non-volatile memory may include, but is not limited to, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM)

The system 300 includes an address translation table 306 and 310, which as depicted in FIG. 3, may be stored in the translation table cache 308 of the volatile memory 302 as volatile address translation table 306 and/or stored in the NAND memory 312 of non-volatile memory 304 as non-volatile address translation table 306. Storing the address translation table 306 and 310 in both volatile memory 302 and non-volatile memory 304, while not necessarily required in all aspects of the innovation, provides for an added level of performance. The address translation table is operable to remap system addresses to physical addresses as a means for decoupling the system addresses from the physical addresses/locations during data read and write operations. As previously mentioned, by decoupling the system and physical addresses the addresses are no longer in a one-to-one relationship and data can be written in a more uniform distribution to locations within the media. This provides for greater overall use of the entire storage media, thus allowing for greater cycle endurance (i.e., erase/program cycles) to be performed before the storage media is exhausted.

The system 300 also includes a write buffer 314 stored in the non-volatile memory 304 and, in the aspect illustrated in FIG. 3, the NOR portion 318 of the non-volatile memory. The write buffer 314 is operable to record address-modifying transactions 316 that occur during a write operation that implements the address translation table 306, 310. The address-modifying transactions 316 may be recorded based on any index or parameter suitable for easily identifying the transactions in the event that the transactions are needed, such as when an error or failure occurs in the write operation. In one aspect the address-modifying transactions 316 may be recorded based on the architecture of the cache used for the volatile translation table (e.g., using the way/set index associated with the transactions).

In alternate aspects, the translation table cache 308 may additionally include bookend recordings 320 that provide of a mapping of the previous (i.e., last-in-time translated physical address to the current translated physical address based on the recoded address modifying transactions. In alternate aspects the bookend recordings may be stored in the NOR portion 318 of the non-volatile memory 304 in addition to or in lieu of storage operation required in the cache-line eviction process to the non-volatile translation table 310. The bookend recordings may be subsequently used in the event of an error or failure, such as power loss, occurring during the write operation, in which the write operation was not completed prior to the error or failure. As a result of the incomplete write operation the system will recover the data associated with the last-in-time translated physical address.

In other alternate aspects, the volatile memory 302 may include an integrity check module 322, such as an Error Correction Code (ECC) module or the like. ECC protection provides for detecting and correcting errors that occurred during the failure. The integrity check module 322 is operable for generating and applying integrity check protection to the data that is being written. In this regard, validation of the integrity check protection in the event of an error or failure, such as a power loss, during the write operation allows for the data that was being written to be recovered if the write operation was completed prior to the error or failure.

As such, in other alternate aspects, the volatile memory 302 may include a recovery module 324 operable to validate the error correction code after an interruption, such as an error or failure, occurring during in the write operation. In the event of an error or failure during the write operation, such as power loss, the recovery module 324 may access the write buffer 314 to identify the translated physical address associated with the last-in-time address modifying transaction 316, access the translated physical address and execute a read operation to determine if a valid integrity check is associated with the data at the translated address. If a valid integrity check is associated with the translated address, then the recovery module 324 will record the translated physical address in the address translation table to insure that future read operations for the specified system address are properly mapped to the current translated physical address. If a valid integrity check is not associated with the translated address, then the recovery module 324 will determine, from the bookend recordings 320 or the like, the previous (i.e., last-in-time) translated physical address associated with the system address and use/access the data that is associated with the last-in-time translated physical address. As will be discussed infra., use of the address remapping procedure of the present innovation allows for data previous recorded to be recovered in the event of an error or failure occurring during the write operation. This is because the previous data associated with the system address is not erased during subsequent write operations. The previous data, while no longer accessible to the user because it is no longer mapped to the current translated physical address, is accessible to the system in the event of an error or failure during the write operation. Thus, in a worst case scenario, in which the write operation was not completed prior to the error or failure, the system of the present innovation will allow for a fall-back position, in which the system provides the data that was associated with the system address prior to the start of the failed write operation.

It is to be appreciated and understood that, while system 300 is depicted with numerous memory components, the subject innovation is not so limited, and the subject innovation can contain less than the memory components shown, the same memory components as shown, or more memory components than are shown, as desired.

Figure 4:
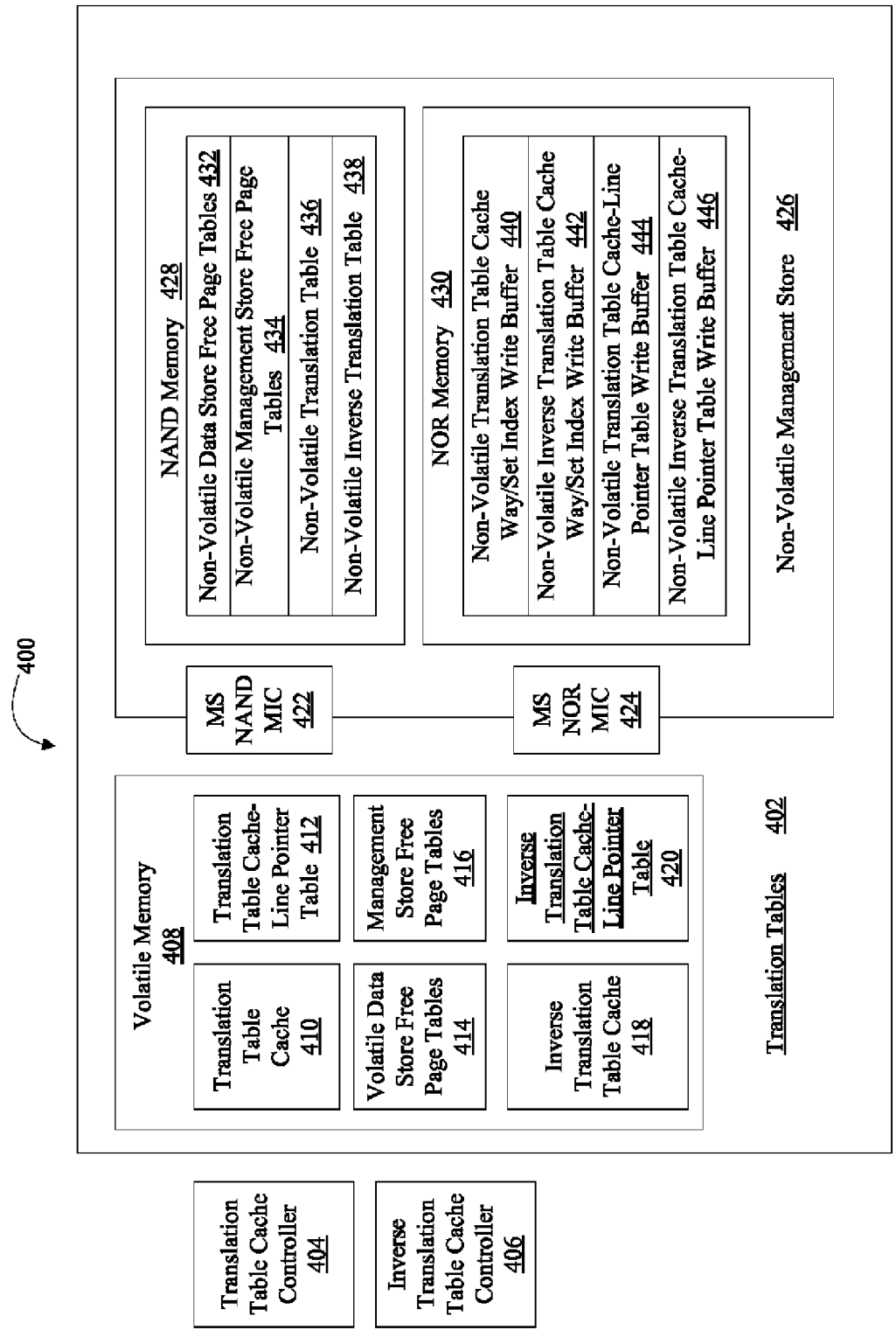
FIG. 4 illustrates a block diagram of a system managing non-volatile memory operations using a translation table that decouples the system address from the physical address/location, in accordance with an aspect of the disclosed subject matter.

FIG. 4 provides a block diagram representation of an exemplary system 400 utilizing translation tables 402 for decoupling the system address and physical address during non-volatile memory processing, according to an embodiment of the present innovation. The translation tables 402 are in communication with translation table cache controller 404 and inverse translation table cache controller 406. The translation table cache controller 404 and inverse translation table cache controller 406 may be embodied in individual devices, as depicted by the block diagram of FIG. 4, or, in alternate embodiments, the controllers 404 and 406 may be embodied in a single controller device. The translation table cache controller 404 is operable for controlling sections of the translation table that maps translations from system address to physical address and the inverse translation table cache controller 406 is operable for controlling sections of the inverse translation table from physical address to system address. The controllers 404 and 406 may also be responsible for providing eviction policy and coherency in terms of updating cache-lines and data elements as need be. It is to be further appreciated and understood that, while controllers 404 and 406 included therein, are depicted as stand-alone components, the subject innovation is not so limited, as the controllers 404 and/or 406 component 114 can be incorporated as part of other components, such as memory component 408 and/or other components (e.g., processor component).

Volatile memory, such as Dynamic Random Access Memory (DRAM), Static Random Access Memory (SRAM) or the like, may provide storage for the translation tables. In this regard, volatile memory may include the translation table cache 410 and the inverse translation table cache 418. The translation table controller 404 in conjunction with translation table cache 410 is operable to perform the translation of the system address to the physical address. In this regard, for read or write operations, the translation table cache 404 in conjunction with the translation table cache 410 may be operable to parse the system address into separate fields and perform a comparison to determine if the cache-line associated with the translation is in the cache. If the cache-line associated with the translation is not currently in the cache, the cache controller will issue a cache-line load operation and when the cache-line is loaded, the cache will provide the data store flash management (not shown in FIG. 4) with the physical address of the translation.

If the memory operation is a write operation, the translation table cache 410 will require a new physical address. As such the translation table controller 404 may access the volatile data store free page tables 441. The volatile memory 408 and, specifically the translation table cache 410 has access to the NAND memory 428 of non volatile management store 426 through management store NAND media interface controller 422. The data store free page tables 414 includes tables of pages available for write operations. In accordance with the present innovation, the available pages are blocks that have been erased and assembled so as to allow for faster overall write operations. For the write operation, the cache controller 404 will allocate a page (i.e., the physical address) from the data store free page tables 414 and provide the physical address to the data store flash management (not shown in FIG. 4). The volatile memory 408 and, specifically, the volatile data store free page tables 414 has access to the NAND memory 428 of the non-volatile management store 426 through management NAND media interface controller 422. The data store management will issue the write operation and when complete notify the translation table cache controller 404, which in turn updates the translation table cache 410 with the physical address provided from the free page table 414.

According to present embodiments, in addition to recording to the new physical address in the translation table cache 410, a bookend entry may also be recorded in the memory for the purpose of subsequent data recovery in the event of an error/failure during a subsequent memory operation, for example a power failure occurring during a subsequent write operation. The bookend entry includes the previous system address to physical address translation and the current system address to physical address translation. The bookend may be stored in the write buffer for the cache-line at the appropriate way/set index or data index location.

The volatile memory 408 also includes translation table cache-line pointer table 412 that is operable to manage the cache-line resource requirements and load/storage operations between the volatile translation table cache 410 and non-volatile translation table 436 in management store 426. The translation table cache-line pointer table 412 is a referencing mechanism that allows allocation of a cache-line for an update to the table. The translation table cache-line pointer table 412 is operable for managing the processes associated with maintaining the non-volatile state of the translation table cache-line pointer tables stored in write buffers 444.

The inverse translation table cache 418 includes the logical translations in the form of a mapping between the system addresses indexed by the physical addresses. The inverse translation table cache 418 is used to assist in identifying pages within a block within the non-volatile data store (not shown in FIG. 4) that facilitates the moving of the pages from block to block to make the block of interest available to be initialized (i.e., erased). The size of the physical to logical translation table, which is referred to as the inverse translation table, is proportional to the address space of the raw data store. The information in the elements of the inverse translation table is related to the current state of the physical page. There are three fields required for each element: the type, the value, and an integrity check. Of these fields, the value field is the largest in terms of size requirement and is context sensitive depending on the type field.

The volatile memory 408 also includes inverse translation table cache-line pointer table 420 that is operable to manage the cache-line resource requirements and load/storage operations between the volatile inverse translation table cache 418 and the non-volatile inverse translation table 438 in management store 426. The inverse translation table cache-line pointer table 420 is a referencing mechanism that allows allocation of a new cache-line for an update to the table. The inverse translation table cache-line pointer table 420 is operable for managing the processes associated with maintaining the non-volatile state of the inverse translation table cache cache-line pointer tables stored in write buffer 446.

As previously mentioned, the management store 426 may include NAND memory 428 and NOR memory 430. The NAND memory may include data store free page tables 432, which provide a mapping of available blocks and/or pages of initialized, ready to be written pages/blocks. The data store free page tables 432 are maintained in non-volatile memory so that for subsequent write operations, which occur during different power-on cycles, accurately reflect the mapping of the pages/block ready to be written. The pages/blocks from the data store free page tables 432 are read out during boot-up to the volatile data store free page tables 414. The NAND memory 428 additionally includes management store free page tables 434, which provide the allocation resource and mechanism for the free page tables 434 to include the meta-data stored in the non-volatile management store 426. In this regard, blocks of available memory must be initialized in order to be allocated and the tables 434 identify initialized areas of memory in the management store 426. The NAND memory will also store the translation tables 436 and the inverse translation tables 438.

The management store 426 additionally includes NOR memory 430, which includes write buffers, such as translation table write buffer, reflecting the architecture of the cache (i.e., a cache way/set index write buffer 440 and inverse translation table cache way/set index write buffer 442. As previously mentioned, in accordance with present embodiments, the way-set indexes serves as markers for identifying logical to physical translation changes in the memory operations, such as write operations and the like. In this regard, the way/set index write buffers 440 and 442 are relied upon in the event of a memory operation failure, such as a power loss or the like, to provide the impetus for data recovery.

Additionally, the NOR memory of 430 management store 426 may include translation table cache-line pointer table write buffer 444 and inverse translation table cache-line pointer table write buffer 446, which maintain the pointers to the cache-lines that compose the tables stored in the non-volatile memory and, as such, insure a robust power-safe translation operation.

Figure 5:
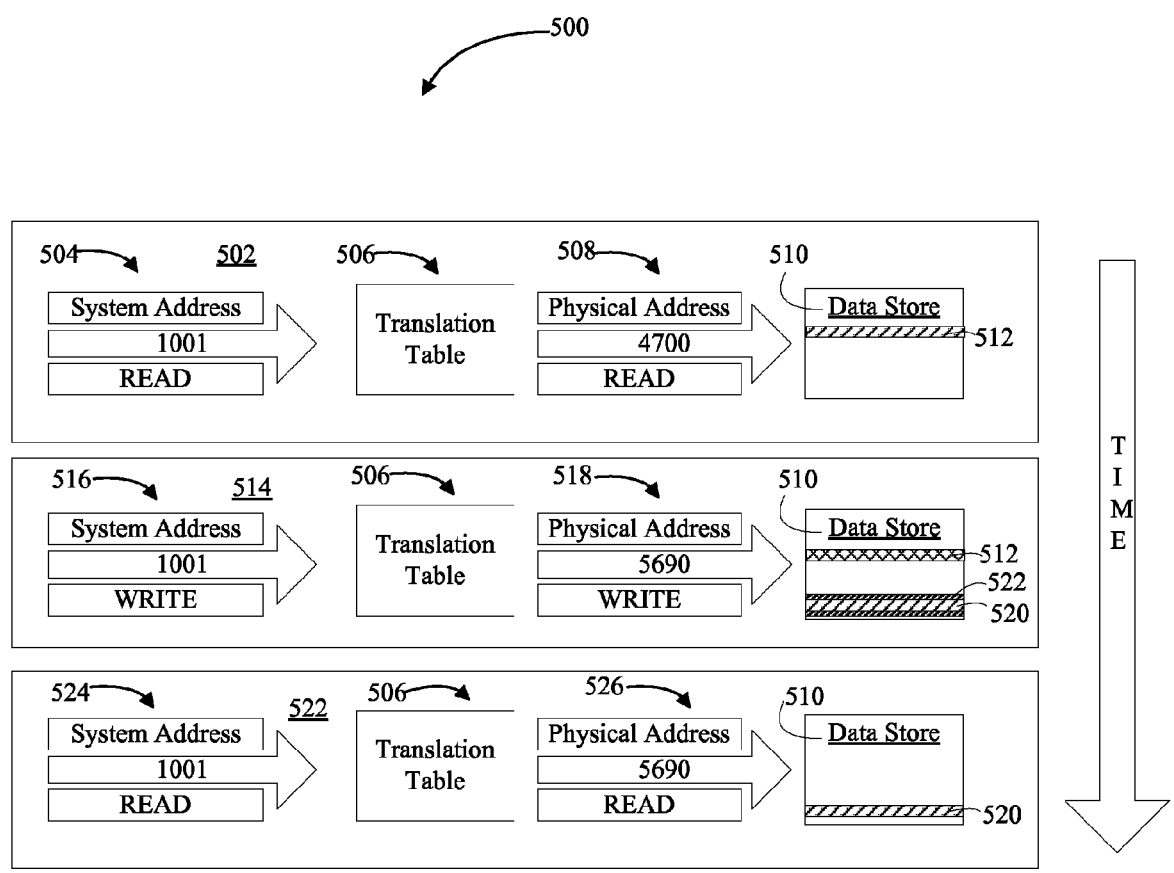
FIG. 5 is a block diagram and associated timeline for read and write operations in non-volatile memory utilizing a translation table that decouples the system address from the physical address/location, in accordance with an aspect of the disclosed subject matter.

FIG. 5 provides a timeline representation 500 of the read and write operations in a flash memory device in which the system address is decoupled from the physical address and requires a translation table for mapping the system address to the physical address, in accordance with an embodiment of the present innovation. For example at block 504, a read operation 502 ensues by providing a system address "1001". A translation table 506, which maps system addresses to physical addresses, is applied to the system address "1001" to decouple the system address from the resulting physical address. At block 508, as a result of applying the system address to the translation table 506, the resulting decoupled physical address is "4700". The data is retrieved from the data store 510 at the location 512 associated with physical address "4700".

The write operation 514 that occurs when the system address is decoupled from the physical address introduces far less latency into the process than is realized in conventional systems in which the system address and the physical address are in a one-to-one relationship. This is because the initialization process (i.e., the erase operation) required by the non-volatile memory to be performed prior to recording information may be performed as a background task, thus eliminating the need to perform erase, and should it be needed, minimizing the amount of data for merge operations within the write operation. For example, at block 516, at a subsequent point in time, a write operation ensues by providing the same system address "1001" that was previous provided in the read operation 502. The translation table 506 is employed to map the system address to a decoupled physical address. At block 518, as a result of applying the system address to the translation table 506, the resulting decoupled physical address for the write operation is "5690". The data is written into the location 520 within the free space 522 of data store 510.

It is noted during and after the subsequent write operation 514 the previous data associated with system address "1001" remains in the location 512 of the data store 510 associated with physical address "4700". Once the write operation 514 ensues or has been completed, the data associated with location 512 is no longer accessible to the system but is accessible internally. By allowing the data to remain in the location during or after subsequent write operations, the previously recorded data is recoverable if the system should lose power during the write operation or otherwise experience a failure during the read operation.

A subsequent read operation 522, ensues at block 524, at which a system address of "1001" is input. The translation table 506 is applied to the system address "1001" to decouple the system address from the resulting physical address. At block 526, as a result of applying the system address to the translation table 506, the resulting decoupled physical address is "5690". The data is retrieved from the data store 510 at the location 520 associated with physical address "5690".

The illustrated translation table processing and decoupling of system address to physical address results in a storage system capable of mitigating cycle endurance limitations. This is because, unlike conventional systems that write high frequency system addresses to the same location in the data store, the present innovation provides for high frequency system addresses to be written to different locations within the data store based on the translation table's ability to decouple the system address from the physical address.

In addition, as a result of the system illustrated in FIGS. 4 and 5 various advantages can be realized in terms of mitigating latency during the write operation. For example, the initialization (i.e., the erase operation) of the flash media may be performed as a background task prior to recording information, as opposed to part of the write operation. In addition, when the requested length of a write operation is less than the unit size for the device write command, the resulting amount of data in the read/merge/write process is only the size of the write command.

Additionally, the system illustrated in FIGS. 4 and 5 provide the basis for recovering data in the event of power loss or any other failure in the write operation. This is because, as shown in FIG. 5, data previously mapped, while not available to the system is available internally for the purposes of recovery.

Figure 6:
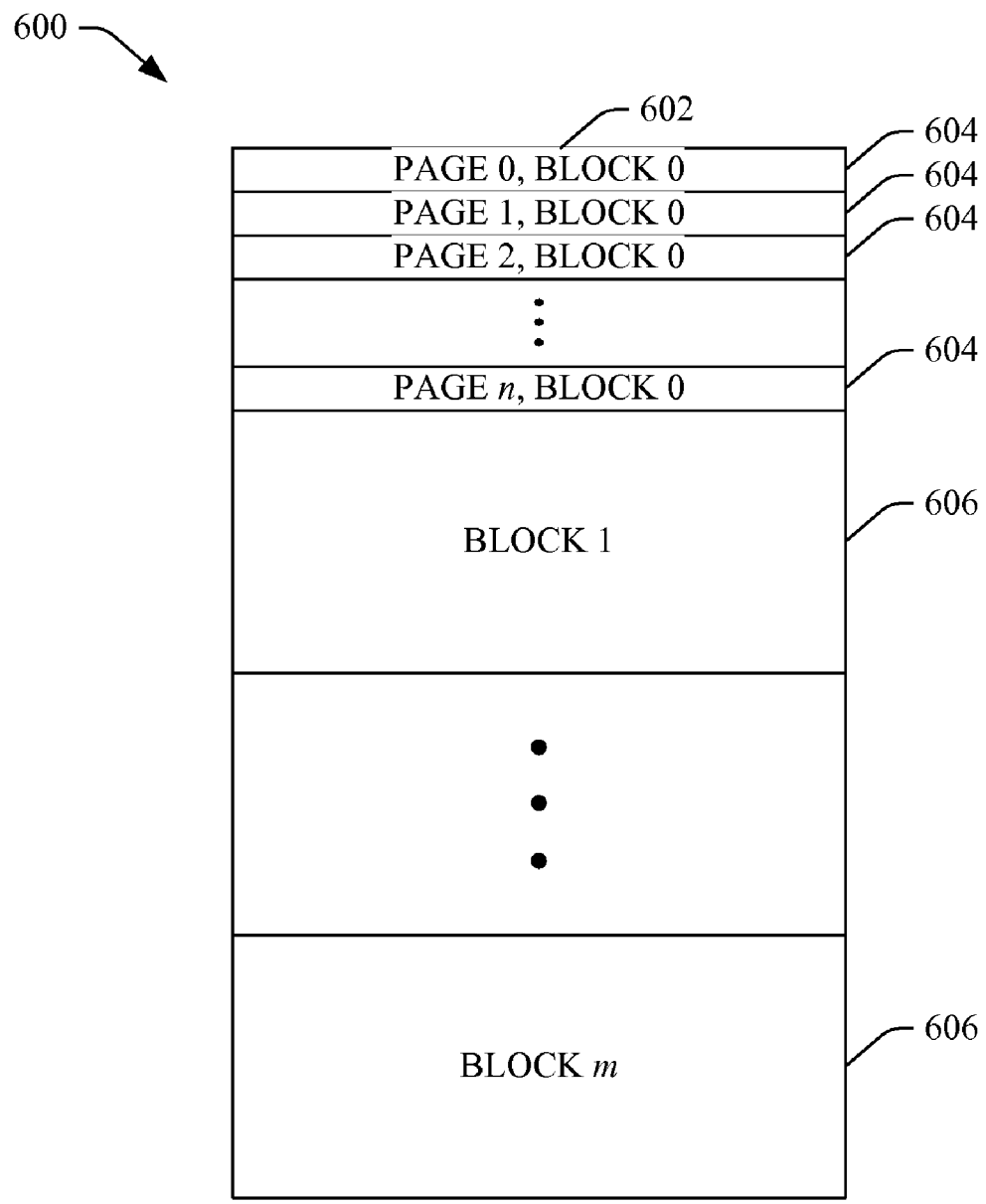
FIG. 6 depicts an example of a block diagram of a portion of a memory component, in accordance with an aspect of the disclosed subject matter.

Turning to FIG. 6, depicted is a block diagram of a portion of a memory 600 that can facilitate storage of data in accordance with an aspect of the disclosed subject matter. The memory 600 can be comprised of a memory array 602 that can contain a plurality of pages 604 that can be comprised of and/or associated with memory cells (not shown) in which data can be stored. Each page 604 can store a predetermined number of bits of data. Each page 604 can include a portion of the page 604 that can store data, such as user data, and a portion of the page 604 can store spare data, such as metadata, wherein, for example, the required data store integrity check, such as ECC, to determine if the write operation was successfully completed or not.

The memory array 602 can also contain a predetermined number of blocks 606 wherein each block 606 can contain a predetermined number of pages 604. For example, in one embodiment, there can be 512 pages 604 per block 606. In one aspect, the memory 600 can be a respective portion of, can be the same or similar as, and/or can include the same or similar functionality as the memory components shown in FIG. 3. In another aspect the memory 600 can comprise a nonvolatile memory (e.g., single-level cell flash memory, multi-level cell flash memory).

Figure 7:
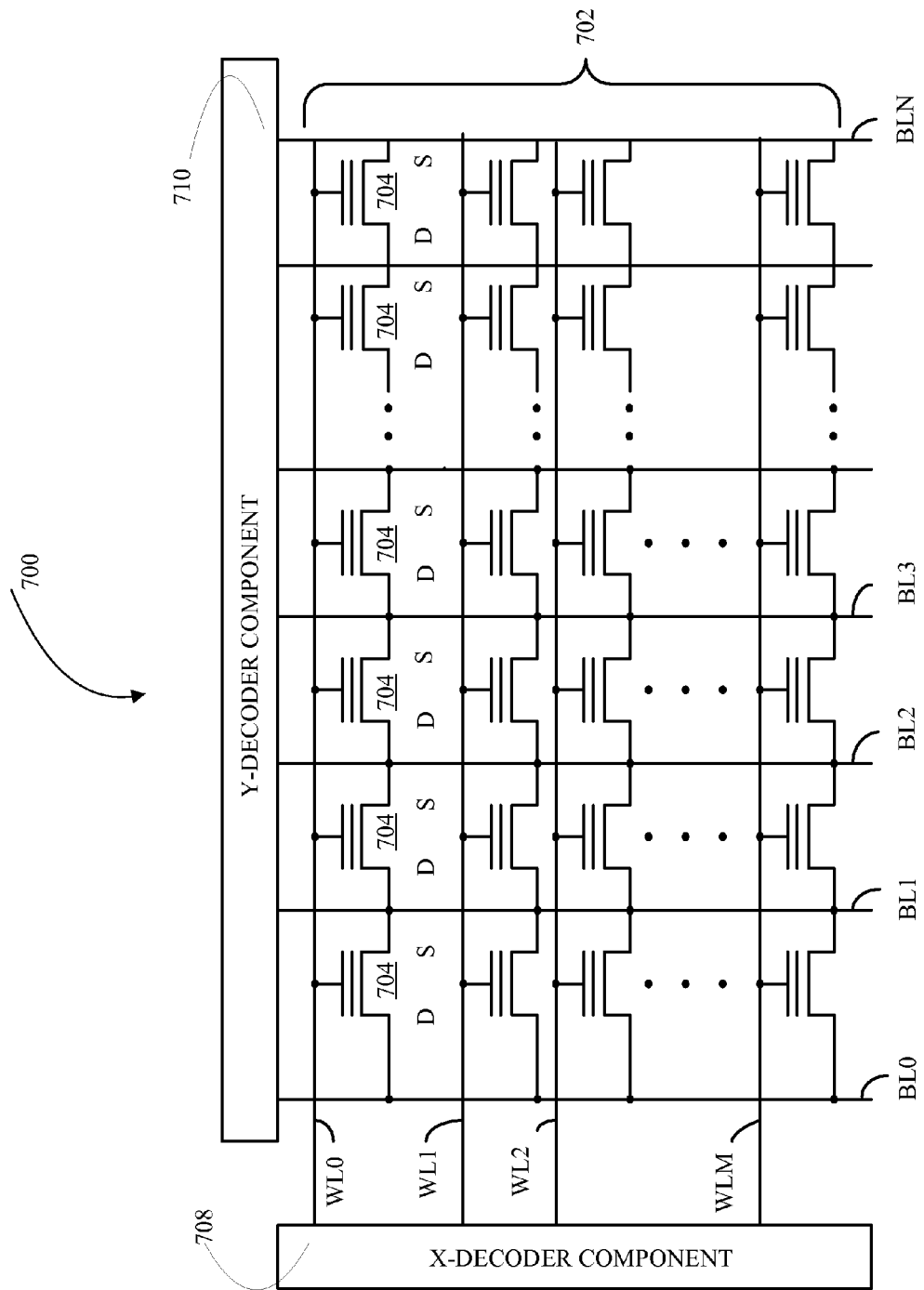
FIG. 7 illustrates a diagram of a portion of a memory array that can facilitate data storage, in accordance with an aspect of the disclosed subject matter.

Turning to FIG. 7, depicted is an example diagram of a portion of a memory array 702 that can be employed to facilitate storage of data in a memory 700 in accordance with an aspect of the disclosed subject matter. The memory array 700 can include a plurality of memory cells 704 that each can be comprised of a drain (D), gate, and source (S). Each memory cell 704 can have one or more levels therein and can store one or more bits of data therein.

The memory array 702 can be associated with an x-decoder component 708 (e.g., Word-Line WL decoder) and a y-decoder component 710 (e.g., Bit-Line BL decoder) that can each respectively decode inputs/outputs during various operations (e.g., programming, reading, verifying, erasing) that can be performed on the memory cells 702. The x-decoder component 708 and y-decoder component 710 can each receive address bus information and/or other information, and can utilize such information to facilitate accessing or selecting the desired memory cell(s) (e.g., memory location (s)) associated with the command. The x-decoder component 708 and y-decoder component 710 each can be the same or similar to respective components, as more fully described herein, and can be included in a memory component with regard to system 300, system 400, etc.

The memory cells 704 can be formed in M rows and N columns. A common WL can be attached to the gate of each memory cell 704 in a row, such as word-lines WL0, WL1, WL2, through WLM. A common BL can be attached to each cell 704 in a column, such as bit-lines BL0, BL1, through BLN. A WL can contain, for example, 1024 elements forming multiple words and a sector can include, for example, 712 WLs to provide at least 512 k elements of memory. In accordance with an aspect of the disclosed subject matter, respective voltages can be applied to one or more cells 704 through the WLs and BLs to facilitate performing operations, such as program, read, erase, and the like.

In accordance with one embodiment of the disclosed subject matter, the memory components and/or other respective components can be situated or implemented on a single integrated-circuit chip. In accordance with another embodiment, the memory components and/or other respective components can be implemented on an application-specific integrated-circuit (ASIC) chip.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 8:
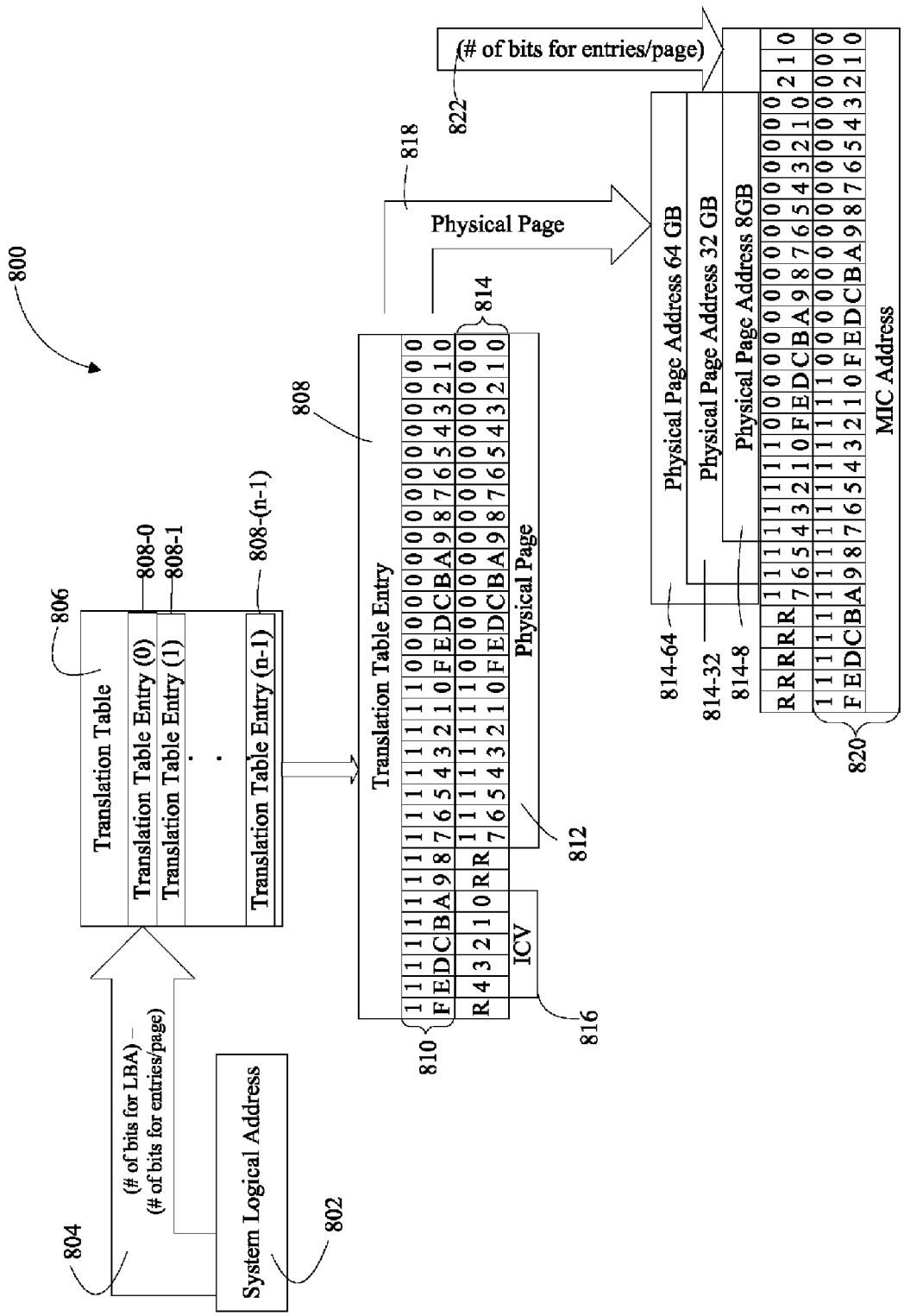
FIG. 8 illustrates a block diagram of a system for system/logical address to physical address translation, in accordance with an aspect of the disclosed subject matter.

FIG. 8 provides a block diagram representation of a system 800 for logical address to physical address translation, according to aspects of the present innovation. The process of a read operation utilizing the address translation is initiated by inputting a system logical address 802 into the translation table 806. The inputting of the system logical address into the translation table is represented by arrow 804. As indicated in the arrow 804 of FIG. 8, (# of bits for LBA)–(# of bits for entries/pages), this signifies that the page (i.e., the unit of read and write in the non-volatile storage media) is typically larger than the Logical Block Address (LBA) (i.e., the unit of read and write for the system). As a consequence, the contents of multiple logical block addresses may fit within a page. For example, a page may be 4096 bytes and an logical address may be 512 bytes, therefore the contents of 8 logical block addresses can be read and/or written for each page read and/or write. The translation table includes translation table entries 808, such as translation table entry (0) 808-0, translation table entry (1) 808-1, up to and including translation table entry (n-1) 808-(n-1), when n equals the maximum logical block address operation. The size of the translation table is proportional to the maximum address value reported to the system and the ratio of logical to physical mapping imposed or implemented, times the element size.

Each translation table entry 808 is indexed by a trucated system logical address 804 to an associated translation table entry 814 composed in part by a physical page 812. In addition the entry 808 may include an integrity check vector, such as an Error Correction Code (ECC) 816, which insures the integrity and validity of the translation table entry 808 and may be used to validate the completion of a write operation in the event of an error or failure occurring during the write operation. The size of the entries depends primarily on two factors: the physical storage location address 814 size and the size of an integrity check vector 816 used to provide error detection and correction capability to guard this critical information. Given a minimum datum size provided by the media interface controller as 32-bits the element size uses a minimum 4 bytes per element.

As an example, if the maximum address value reported is $2^{27}$ (64 GB, assuming 512 bytes/address), and using a ratio $2^3$ to 1 logical to physical location, then the element count required for the table is $2^{(27-3)}$ or 16 mega-entries. In other words, the physical storage location address 814 size requires a 24-bit field. This leaves 8 bits for the integrity check value and an optional reserved field (shown in FIG. 8 as fields "R").

Once an entry is found in the translation table 808 for the inputted system logical address 802, the entry is provided to a controller (not shown in FIG. 8). The arrow 818 represents the process of providing the physical page information 812 from the translation table entry 808 to the controller.

The controller includes a mapping of physical page addresses to media interface controller (MIC) addresses 820 for the purpose of issuing command sequences to execute the given operation. The length of the physical page address is dictated by the size of the physical page. For example, a 64 GB physical page address 814-64 will include a 24-bit field, a 32 GB physical page address 814-32 will include a 23-bit field and an 8 GB physical page address 814-8 will include a 21-bit field. Additional bits are assumed to be zero for the number of bits for entries per page, as illustrated by arrow 822.

Figure 9:
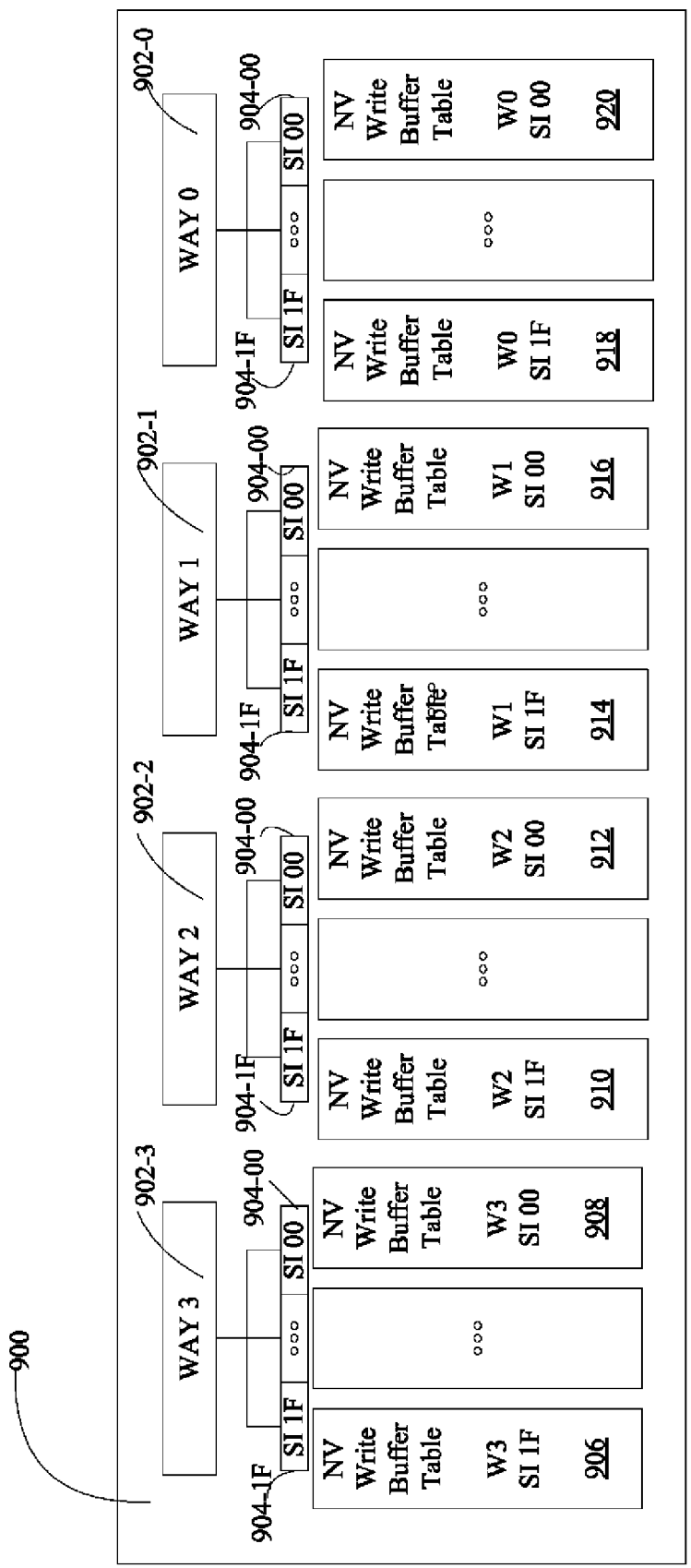
FIG. 9 depicts a block diagram of a logical/system address to physical address translation table write buffer, illustrating way-set indexing, in accordance with an aspect of the disclosed subject matter.

FIG. 9 is a block diagram representation of the translation table write buffer based on using a 4-way set associative architecture for the translation table cache, according to an aspect of the present innovation. The elements of the cache are portions of the translation table for which the system is requesting either a read or write operation. Since the part of the table in the cache is small compared with the total size of the translation, the organization of the cache plays a significant role in system performance. The organization of the cache is established based on the portion of the logical system address used as an index into the translation table. This index is referred to as the translation table offset (TTO). The TTO is partitioned into three pieces: the Tag field, the Set Index, and the Data Index. When applied to the cache, these fields are examined in parallel to identify if the cache-line represented by the value is resident in the cache.

The process to determine if a value is in the cache uses the Set Index to identify in each Way if a valid cache-line exists and if the Tag field for that cache-line matches with the Tag field of the requested element. When a match is found, meaning a cache hit occurred, then the operation proceeds, otherwise a cache miss must be processed.

The cache-miss process implies a cache-line must be read in from non-volatile memory. If a location in the cache exists for the new cache-line to be stored once it has been read in then the process may proceed once the information of interest is available, otherwise a location must be determined. This location is dependent on what is referred to as the eviction policy of the cache.

When a location in the cache does not exist then a cache-line must be evicted from the cache. When the data in the cache-line has not been modified (i.e., no write operations were performed) the required eviction incurs no need to write to non-volatile storage; however, if it has been modified from the time when it was originally read from non-volatile memory then the modified cache-line must be saved off into non-volatile memory. This can occur in one of two ways. The first approach is to use the contents of the modified cache-line as the source of the information to be stored into the new cache-line section of the table. The second approach, which is relevant to the present innovation and is used when an error or failure occurs during the write operation, is to take the original information in the non-volatile memory into a merge buffer and overlay the contents of the write buffer, after filtering for duplicate addresses, to provide the source of the changed information.

Whenever a write operation is requested for a system logical address the existing translation content is written to a write buffer. This is one bookend in the translation process. Following this operation a new physical address is acquired from a free page table and this provided to the data store flash management module to use as the location to write the system data. When the write operation has completed successfully, the data store flash management indicates to the translation table process the success of the operation. The translation table process updates the translation information at the appropriate cache-line, using the way, set index, and data index as the location. In addition, to reflect the change of translation in a power safe manner, the other transaction bookend must be written to the write buffer to complete the recording of the transaction.

In FIG. 9, the way information 902-0, 902-1, 902-2 and 902-3 points to a specific bank in the write buffer which is associated with the current contents of that way of the cache. To further refine the location to record the transaction, the set information, 904-1F-904-00 points to a specific bank within the associated way information. Within the specified bank transactions are recorded into a write buffer (e.g., write buffers 906-908 for corresponding way information 902-3, write buffers 910-912 for corresponding way information 902-2, write buffers 914-916 for corresponding way information 902-1 and write buffers 918-920 for corresponding way information 902-0). By organizing the location for transaction write buffer information in this manner, the process of identifying the translation is greatly simplified should a recovery be necessitated.

Figure 10:
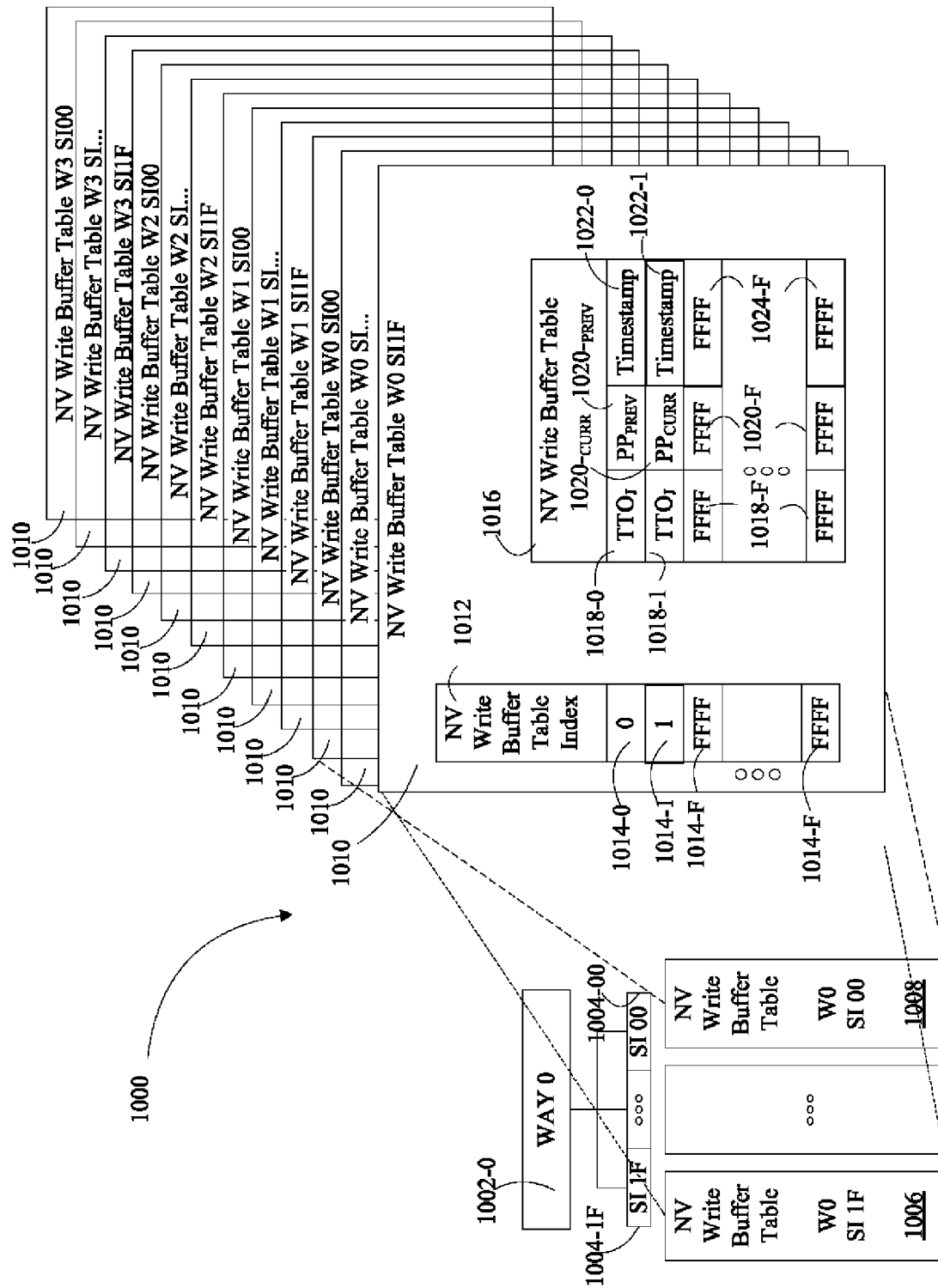
FIG. 10 depicts a block diagram of way/set index in a logical/system address to physical address translation table write buffer, according to an aspect of the present innovation.

Referring to FIG. 10, a block diagram of a translation table write buffer is shown, in accordance with the present innovation. For each way and set in the translation table set associative cache there exists a write buffer 1010 for recording transactions that modify the logical to physical address translation as in the case of a write operation. The write buffer 1010 is composed of two elements: the write buffer table index 1012 and the write buffer table 1016. It is assumed the non-volatile memory required to provide this support is in an initialized state, ready to be written. As such, when an operation requires the use of a write buffer the first step in the process is to write the table index value 1014 corresponding to the first available location of the write buffer table 1016. For example, in the illustrated aspect of FIG. 10, table index value "0" 1014-0 indicates the first available location of the write buffer table 1016.

The second step, after the first available table index value 1014-0 is written, is to record into the write buffer table 1016 at the given index the information that reflects the existing state of the system. In this case, the translation table offset (TTO) 1018-0, the physical page (PP) address of the last-in-time translation ("PREV") $1020\text{-}_{PREV}$, and a timestamp 1022-0 or equivalent value are written. The third step is the write the value of the next table index, which corresponds to the next available location of the write buffer table. For example, in the illustrated aspect of FIG. 10, table index value "1" 1014-1 indicates the next available location of the write buffer table 1016.

The fourth step is to record the translation table offset, the new physical page address ("CURR"). In this case, the translation table offset (TTO) 1018-1 and the PP address of the current translation ("CURR") $1020\text{-}_{CURR}$, are written. The fifth step in the sequence occurs after the data store operation completes. In the fifth step a timestamp or equivalent value is written to the translation table offset and the transaction is complete. In this case, timestamp 1022-1 is written. As stated above, it is assumed that the non-volatile memory required to provide this support is in an initialized state, ready to be written. 1018-F, 1020-F and 1024-F represent table entry locations in their initialized state, ready to be written. In the event of a sudden loss of power the changes to the translation table, which have not been recorded into the non-volatile translation table, will be reconstructed by examining the state of the various elements of the write buffer. By organizing the write buffer to reflect the organization of the cache, the process of reconstructing the information of the translation table is anticipated and by design changes are aggregated to facilitate that process.

Figure 11:
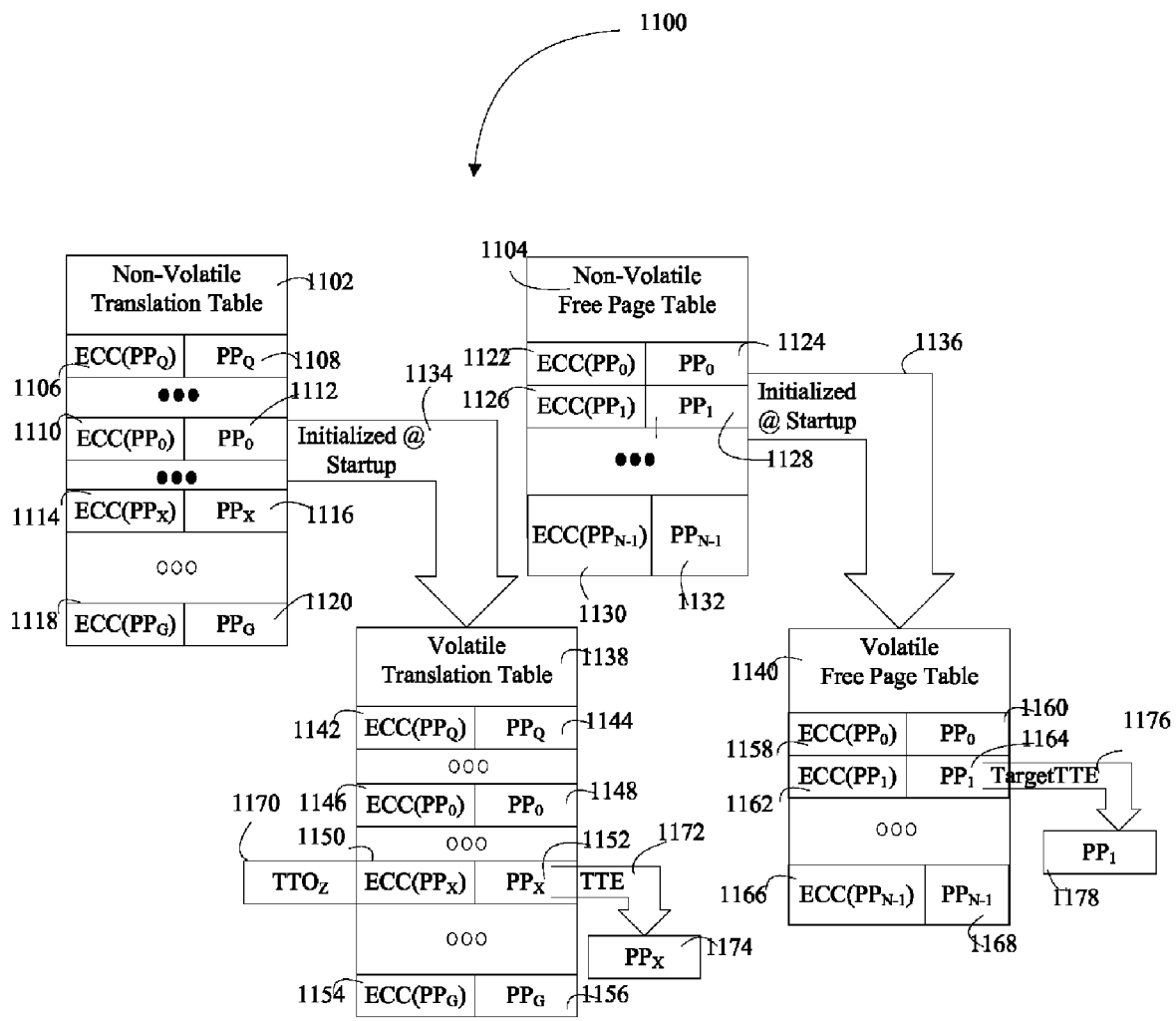
FIG. 11 depicts block diagram illustrating application of Error Code Corrections to the metadata and translations in a write operation, in accordance with an aspect of the disclosed subject matter.

Referring now to FIG. 11, a block diagram is depicted that illustrates a system 1100 for application of integrity checks, such as Error correction Codes (ECC) to the translated physical addresses/locations. Since the translation table represents the mapping of logical to physical addresses each element in the translation table is considered critical in nature and therefore protected from inaccuracy with an integrity check, such as an Error Correction Code (ECC). An integrity check, such as ECC, is generated and applied to each physical page in the non-volatile translation table 1102 and the non-volatile free page table 1104. For example, in the non-volatile translation table 1102, ECC $(PP_Q)$ 1106 is generated and applied to physical page Q $(PP_Q)$ 1108, ECC$(PP_O)$ 1110 is generated and applied to physical page O $(PP_O)$ 1112, ECC$(PP_X)$ 1114 is generated and applied to physical page X $(PP_X)$ 1116 and ECC$(PP_G)$ 1118 is generated and applied to physical page G $(PP_G)$ 1120. Similarly, in the nonvolatile free page table 1104, ECC$(PP_0)$ 1122 is generated and applied to free physical page 0 $(PP_0)$ 1124, ECC$(PP_1)$ 1126 is generated and applied to free physical page 1 $(PP_1)$ 1128, and ECC$(PP_{N-1})$ 1130 is generated and applied to free physical page N-1 $(PP_{N-1})$ 1132 where N-1 is the last available free page. The ECC protecting the physical page is generated when assembling the elements of the free page table from which allocations are made.

At reset time (i.e., the start-up after an error or failure has occurred, such as power loss failure or the like) a verification or validation of the ECC occurs at the non-volatile translation table 1102 and non-volatile free page table 1104 to guarantee the information it represents is correct to the highest possible degree. If the validation/verification is successful, the non-volatile translation table 1102 and the non-volatile free page table 1104 are copied into volatile memory, as indicated by arrows 1134 and 1136, and result in volatile translation table 1138 and volatile free page table 1140. Similar to the non-volatile tables 1102 and 1104, each physical page in the volatile tables 1138 and 1140 will have a corresponding ECC. For example, in the volatile translation table 1138, ECC$(PP_Q)$ 1142 corresponds to physical page Q $(PP_Q)$ 1144, ECC$(PP_O)$ 1146 corresponds to physical page O $(PP_O)$ 1148, ECC$(PP_X)$ 1150 corresponds to physical page X $(PP_X)$ 1152 and ECC $(PP_G)$ 1154 corresponds to physical page G $(PP_G)$ 1156. Similarly, in the volatile free page table 1140, ECC$(PP_0)$ 1158 corresponds to free physical page 0 $(PP_0)$ 1160, ECC$(PP_1)$ 1162 corresponds to free physical page 1 $(PP_1)$ 1164, and ECC$(PP_{N-1})$ 1166 corresponds to free physical page N-1 $(PP_{N-1})$ 1168 where N-1 is the last available free page. If the verification/validation of the ECC is unsuccessful, the correction mechanism will be applied to the address, as designated by the translation table and provide the system with the data associated with that location.

TTO$_Z$ 1170 is the index into the translation table for the given operation. The arrow TTE 1172 indicates the content from the physical page X $(PP_X)$ 1152 leading to block $PP_X$ 1174, which is the physical address provided to the data store flash management to apply for the given operation. Arrow TargetTTE 1176 represents the translation table entry including the physical address $PP_1$ 1178 provided to the data store flash management when a new address is required, as in the case of a write operation.

Figure 12:
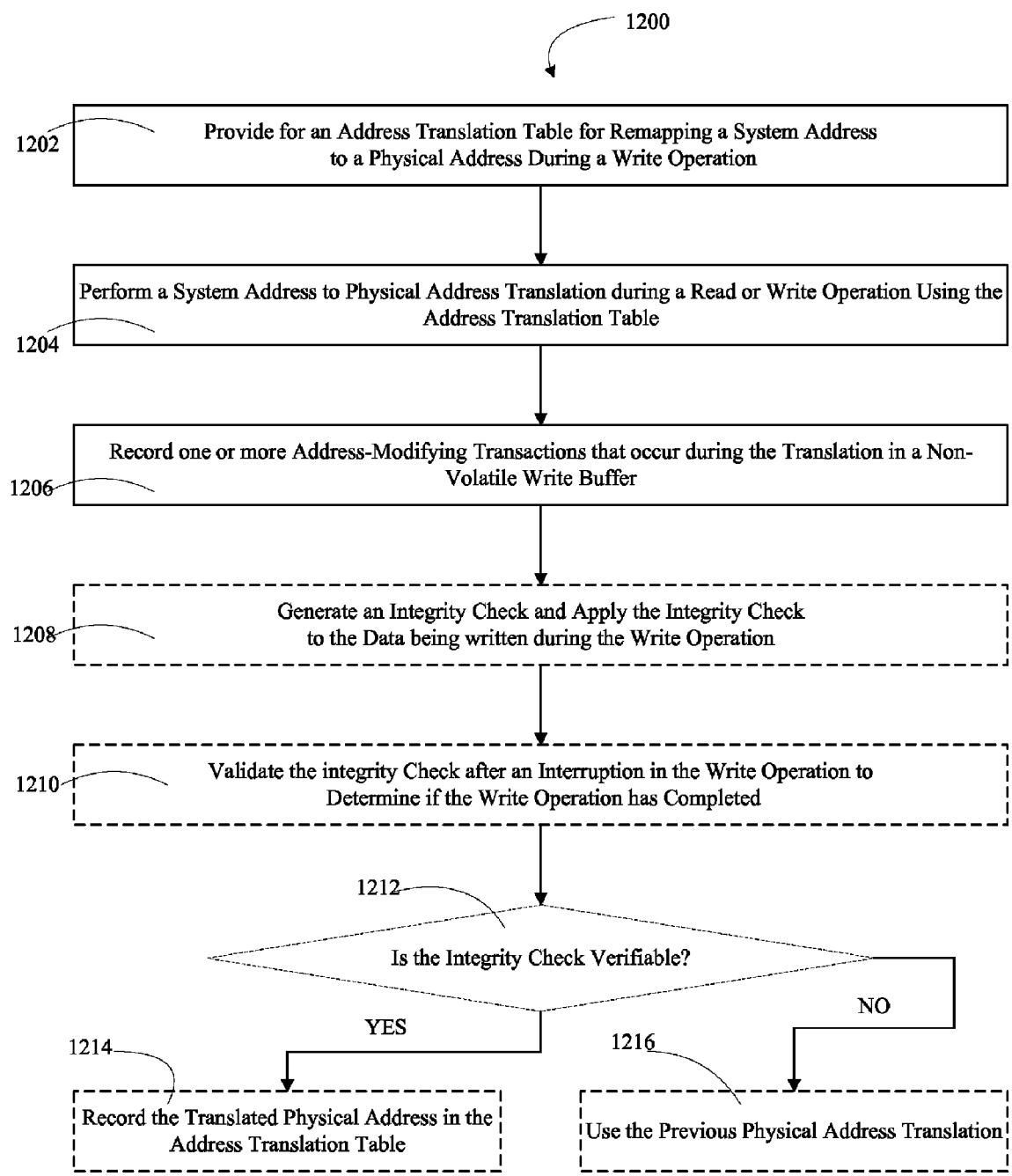
FIG. 12 illustrates a methodology for insuring data recovery in the event of a memory operation error/failure in a non-volatile memory system, in accordance with an aspect of the subject matter disclosed herein.

FIG. 12 illustrates a methodology and/or flow diagram in accordance with the disclosed subject matter. For simplicity of explanation, the methodology is depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodology in accordance with the disclosed subject matter. In addition, those skilled in the art will understand and appreciate that the methodology could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 12, illustrated is a methodology 1200 that can facilitate insuring data recovery in a non-volatile memory system in the event of an operational failure or error, in accordance with an aspect of the disclosed subject matter. At Event 1202, an address translation table is provided for remapping a system address to a physical address (otherwise, referred to herein, as decoupling the system address from the physical address) during a write operation. As previously mentioned, by decoupling the system and physical addresses the addresses are no longer in a one-to-one relationship and data can be written to more random locations within the media. This provides for greater overall use of the entire storage media, thus allowing for greater cycle endurance (i.e., erase/program cycles) to be performed before the storage media is exhausted.

At Event 1204, when a write operation is performed that provides for a system address to mapped to a new physical address translation using the address translation table and, at Event 1206, the address-modifying transactions that occur during the translation are recorded in a non-volatile write buffer. Recording of the address modifying transactions in the write buffer provides for integrity of the overall write operation in the event of an error or failure occurring during the operation. The address modifying transactions serve to provide a record of the previous state information and current information state and, thereby, provide the basis for data recovery in the event of an error or failure, such as a power loss, occurring during the write operation. In one aspect of the innovation, the address-modifying transactions are recorded based on the way set index of the translation table cache associated with the translated address. The recording of the address modifying transactions may serve as the basis for providing and recording bookend information that associate the previous translated address with the current translated address.

At optional Event 1208, an integrity check, such as Error Correction Code (ECC) or the like, is generated and applied to the data being written during the operation. Integrity check protection allows for validation to occur after the occurrence of an error or failure, such at power-up when a power loss has occurred. Thus, at optional Event 1210, a validation of the integrity check occurs after an interruption in the write operation to determine if the write operation completed prior to the interruption/failure and to take appropriate action if the write operation did not successfully complete. At optional Decision 1212, a determination is made as to whether the integrity check can be validated. If the integrity check can be validated, which indicates that the write operation completed prior to the error/failure occurring, then at optional Event 1214, the translated physical address is recorded as an entry in the address translation table. However, if the integrity check can not be validated, at optional Event 1216 the system will access the translation tables and/or the bookend information to determine the previous, i.e., last-in-time translated physical address and return the data associated with the last-in-time translated physical address.

It is to be appreciated and understood that the subject innovation is not limited by the acts illustrated and/or by the order of acts, as, for example, acts can occur in various orders and/or concurrently, and with other acts not presented and described herein. In one aspect, the memory component and the at least one other memory component can operate in parallel and/or an interleaved manner to service their respective subset of commands, such that each memory component can service its respective subset of commands at the same or substantially the same time as the other memory component(s) services its respective subset of commands to facilitate improved data access and retrieval.

In accordance with one embodiment, the data transfers can be de-centralized, such that each memory component can contain its own transfer buffer component, which can receive and store data associated with its subset of commands. Each memory component can provide the data stored in its transfer buffer component when all commands in its queue have been serviced. The data can be received from the memory components by the transfer controller component, and the transfer controller component can place the received data in its proper order in its transfer buffer component based in part on the transfer map. The transfer controller component can then transmit the data to the processor component.

The subject innovation can facilitate improved memory access and data retrieval, as compared to conventional systems, as each memory component can service data requests (e.g., commands in its queue) independent of the other memory components and/or can facilitate transferring the data to the transfer controller component, even when another memory component(s) has not finished servicing any or all of its respective subset of commands. At this point, methodology 1200 can end.

Figure 13:
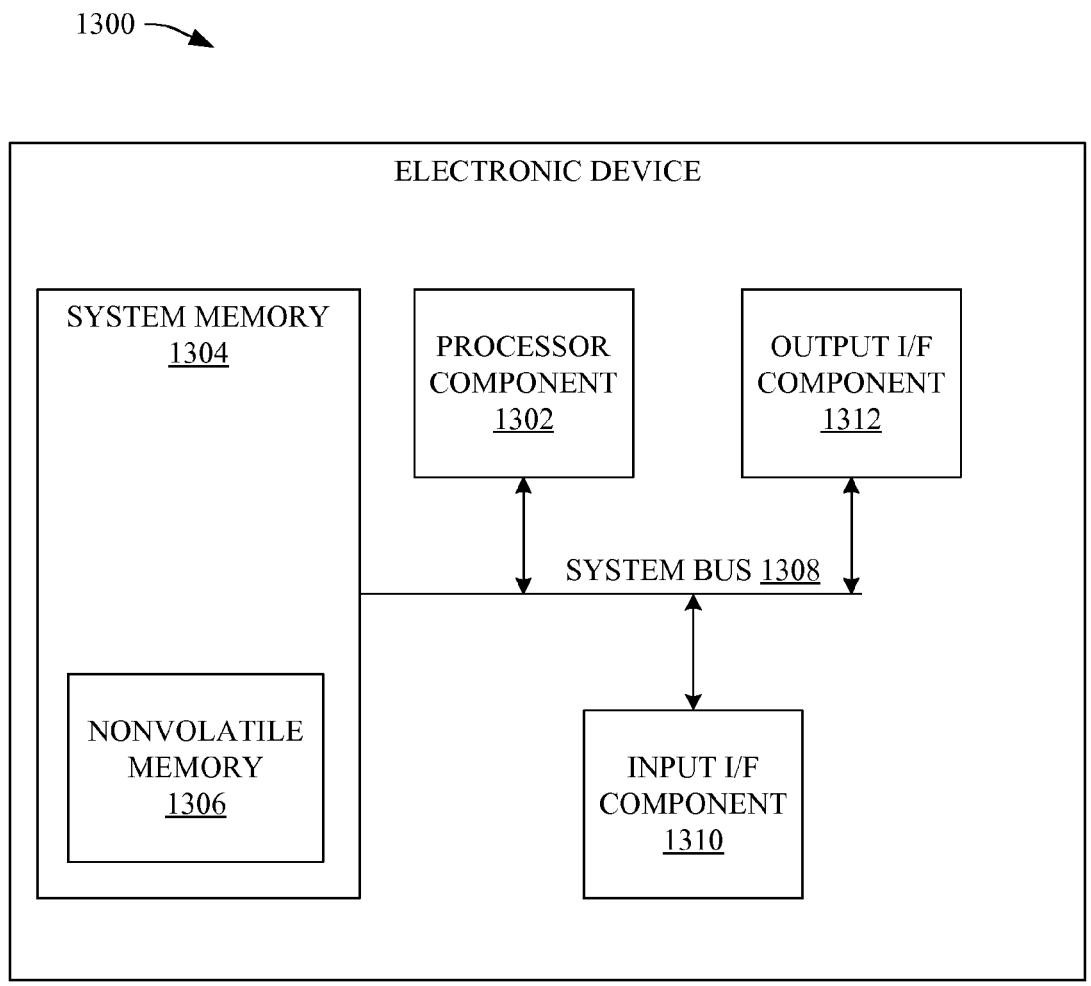
FIG. 13 illustrates an example of an electronic device that can be associated with a memory in accordance with an aspect of the disclosed subject matter.

Referring to FIG. 13, illustrated is a block diagram of an exemplary, non-limiting electronic device 1300 that can comprise and/or incorporate system 300, system 400 and/or system 700, or a respective portion(s) thereof. The electronic device 1300 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 1300 can include, but are not limited to, a processor component 1302, a system memory 1304, which can contain a nonvolatile memory 1306, and a system bus 1308 that can couple various system components including the system memory 1304 to the processor component 1302. The system bus 1308 can be any of several types of bus structures including a memory bus or memory controller, a peripheral bus, or a local bus using any of a variety of bus architectures.

Electronic device 1300 can typically include a variety of computer readable media. Computer readable media can be any available media that can be accessed by the electronic device 1300. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1306 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1300. Communication media typically embodies computer readable instructions, data structures, program modules or other data in a modulated data signal such as a carrier wave or other transport mechanism and includes any information delivery media.

The system memory 1304 can include computer storage media in the form of volatile (e.g., SRAM) and/or nonvolatile memory 1306 (e.g., flash memory). For example, nonvolatile memory 1306 can comprise one or more memory components that can be the same or similar, or can contain the same or similar functionality, as memory components as described with regard to system 300, system 400, etc.). A basic input/output system (BIOS), containing the basic routines that can facilitate transferring information between elements within electronic device 1300, such as during start-up, can be stored in the system memory 1304. The system memory 1304 typically also can contain data and/or program modules that can be accessible to and/or presently be operated on by the processor component 1302. By way of example, and not limitation, the system memory 1304 can also include an operating system(s), application programs, other program modules, and program data.

The nonvolatile memory 1306 can be removable or non-removable. For example, the nonvolatile memory 1306 can be in the form of a removable memory card or a USB flash drive. In accordance with one aspect, the nonvolatile memory 1306 can include flash memory (e.g., single-bit level cell flash memory, multi-level cell flash memory), ROM, PROM, EPROM, EEPROM, or NVRAM (e.g., FeRAM), or a combination thereof, for example. Further, a flash memory can comprise NOR flash memory and/or NAND flash memory.

A user can enter commands and information into the electronic device 1300 through input devices (not shown) such as a keypad, microphone, tablet, or touch screen although other input devices can also be utilized. These and other input devices can be connected to the processor component 1302 through input interface component 1310 that can be connected to the system bus 1308. Other interface and bus structures, such as a parallel port, game port or a universal serial bus (USB) can also be utilized. A graphics subsystem (not shown) can also be connected to the system bus 1308. A display device (not shown) can be also connected to the system bus 1308 via an interface, such as output interface component 1312, which can in turn communicate with video memory. In addition to a display, the electronic device 1300 can also include other peripheral output devices such as speakers (not shown), which can be connected through output interface component 1312.

It is to be understood and appreciated that the computer-implemented programs and software can be implemented within a standard computer architecture. While some aspects of the disclosure have been described above in the general context of computer-executable instructions that can be run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

It is also to be understood and appreciated that cryptographic protocols can be employed to facilitate security of data associated with a memory in accordance with the disclosed subject matter. For example, a cryptographic component (e.g., cryptographic engine) can be employed and can facilitate encrypting and/or decrypting data to facilitate securing data being written to, stored in, and/or read from the memory. The cryptographic component can provide symmetric cryptographic tools and accelerators (e.g., Twofish, Blowfish, AES, TDES, IDEA, CAST5, RC4, etc.) to ensure that a specified partition in the memory component, or portions thereof, can only be accessed by those entities authorized and/or authenticated to do so. The cryptographic component can also provide asymmetric cryptographic accelerators and tools (e.g., RSA, Digital Signature Standard (DSS), and the like) to ensure that a specified partition in a memory, or portions thereof, only can be accessed by those entities that are authorized and certified to do so. Additionally, the cryptographic component can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in the memory is confined to those entities authorized to gain access.

It is to be appreciated and understood that authentication protocols can be employed to facilitate security of data associated with the memory in accordance with the disclosed subject matter. For example, an authentication component can solicit authentication data from an entity, and, upon the authentication data so solicited, can be employed, individually and/or in conjunction with information acquired and ascertained as a result of biometric modalities employed, to facilitate control access to the memory. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication component. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

As utilized herein, terms "component," "system," "interface," and the like, are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Thus, present aspects herein described above provide for improved accuracy in write operations that use address translations to remap system addresses/locations to physical/device addresses/locations in order to distribute the use of the non-volatile memory in terms of cycle endurance (i.e., erase/program cycles). Present aspects provide for recording/storing the address-modifying transactions in a non-volatile write buffer as a means of providing an association between the previous address translation address/location and the current address/location. In addition, present aspects of the innovation may provide for integrity check protection, such as Error Correction Code (ECC) protection or the like, to be applied to the translated physical address and the data being written, such that integrity check validation may be performed in the event of an write operation error or failure, such as due to sudden power loss or the like. Integrity check validation allows for recovery of write operations which may have not fully completed prior to the error or failure and for the system to refer back to the previous physical address translation and the data associated therewith, if the integrity check validation is not verified. In this regard, the system provides integrity to the write operation to the greatest extent possible with minimizing the loss of data and providing a reference back to the previously written data if the write operation was not completed to the extent necessary.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A memory system that insures data recovery in the event of a memory operation failure, comprising:
a volatile memory;

a non-volatile memory in communication with the volatile memory;

an address translation table stored in at least one of the volatile memory or the non-volatile memory, wherein the address translation table is operable for decoupling a system address from a physical address during a memory write operation; and a write buffer located in the non-volatile memory operable for storing one or more address-modifying transactions that occur during a memory write operation that implements the address translation table.

2. The system of claim 1, further comprising a translation table cache located in the volatile memory and operable for storing the address translation table.

3. The system of claim 2, wherein the translation table cache is further operable for storing a bookend recording of a last-in-time translated physical address and a current translated physical address based on the recorded one or more address modifying transactions.

4. The system of claim 1, wherein the write buffer is further defined as a way-set index write buffer operable for storing the one or more address-modifying transactions based on a set associative cache.

5. The system of claim 1, further comprising an integrity check module stored in at least one of the volatile memory or non-volatile memory operable for generating an integrity check to data being written during the write operation.

6. The system of claim 5, wherein the integrity check module is further defined as an Error Correction Code (ECC) module operable for generating and applying an ECC to the data being written during the write operation.

7. The system of claim 5, further comprising recovery module stored in at least one of the volatile memory or the non-volatile memory and operable to validate the integrity check after an interruption in the write operation to determine if the write operation has completed.

8. The system of claim 6, wherein the recovery module is further operable to record the translated physical address in the address translation table if the integrity check is validated.

9. The system of claim 6, wherein the recovery module is further operable to use a last-in-time physical address translation if the error correction code is not validated.

10. An electronic device comprising the system of claim 1.

11. The electronic device of claim 10, the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with a motor vehicle, a global positioning satellite (GPS) device, an electronic device associated with an airplane, an electronic device associated with an industrial control system, a Hardware Security Module (HSM), a set-top box, a secure memory device with computational capabilities, or an electronic device with at least one tamper-resistant chip.

12. A method for insuring data recovery in the event of a memory operation failure in a non-volatile memory system, comprising:

providing for an address translation table that is operable for decoupling a system address from a physical address during a memory write operation;

performing a system address to physical address re-mapping during a write operation using the address translation table; and storing one or more address-modifying transactions that occur during the write operation in a non-volatile write buffer.

13. The method of claim 12, further comprising storing a bookend recording of a last-in-time translated physical address with a current translated physical address based on the stored one or more address-modifying transactions.

14. The method of claim 12, wherein storing the one or more address-modifying transactions that occur during the translation in a non-volatile write buffer further comprises storing the one or more address-modifying transactions based on a architecture of a set associative way/set index of a translation table cache.

15. The method of claim 12, further comprising generating an integrity check and applying the integrity check to data being written during the write operation.

16. The method of claim 15, wherein generating an integrity check further comprises generating an Error Correction Code (ECC) and applying the error correction code to the data being written during the write operation.

17. The method of claim 15, further comprising validating the integrity check after an interruption in the write operation to determine if the write operation has completed.

18. The method of claim 17, further comprising recording the translated physical address in the address translation table if the integrity check is validated.

19. The method of claim 17, further comprising using a last-in-time physical address translation if the integrity check is not validated.

20. The method of claim 15, wherein validating the integrity check further comprises:

accessing the non-volatile write buffer to identify the translated physical address where write operation was occurring prior to the interruption;

accessing the translated physical address; and executing a read operation to determine if an integrity check is associated with the translated physical address.

* * * * *